United States Patent
Balasubramanian et al.

(10) Patent No.: US 11,560,108 B2
(45) Date of Patent: Jan. 24, 2023

(54) VEHICLE SAFETY SYSTEM AND METHOD IMPLEMENTING WEIGHTED ACTIVE-PASSIVE CRASH MODE CLASSIFICATION

(71) Applicant: ZF FRIEDRICHSHAFEN AG, Friedrichshafen (DE)

(72) Inventors: Kiran Balasubramanian, Canton, MI (US); Charles A. Bartlett, Commerce Township, MI (US); Andreas Fleckner, Mühlhausen-Ehingen (DE); Harald Pfriender, Constance (DE); Raymond David, Dearborn Heights, MI (US); Huahn-Fern Yeh, Novi, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 93 days.

(21) Appl. No.: 16/823,561

(22) Filed: Mar. 19, 2020

(65) Prior Publication Data

US 2021/0291768 A1    Sep. 23, 2021

(51) Int. Cl.
*B60R 21/013* (2006.01)
*B60R 21/0132* (2006.01)
(Continued)

(52) U.S. Cl.
CPC ........ *B60R 21/013* (2013.01); *B60R 21/0132* (2013.01); *B60R 21/0134* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,341,252 B1 * | 1/2002 | Foo | B60R 21/01554 180/268 |
| 6,542,073 B2 * | 4/2003 | Yeh | B60R 21/01336 340/471 |

(Continued)

FOREIGN PATENT DOCUMENTS

| | | | | |
|---|---|---|---|---|
| CN | 102271969 A | * | 12/2011 | ........... B60R 21/013 |
| CN | 104781108 A | * | 7/2015 | ......... B60R 21/0132 |

(Continued)

OTHER PUBLICATIONS

"Collision mitigation for crossing traffic in urban scenarios;" Philip Heck, Jan Bellin, Martin Matousek, Stefan Wonneberger, Ondrej Sychrovsky, Radim Sara, Markus Maurer; 2013 IEEE Intelligent Vehicles Symposium (IV) (pp. 559-566); Oct. 10, 2013. (Year: 2013).*

(Continued)

*Primary Examiner* — Khoi H Tran
*Assistant Examiner* — Jorge O Peche
(74) *Attorney, Agent, or Firm* — Tarolli, Sundheim, Covell & Tummino LLP

(57) ABSTRACT

A vehicle safety system implements a method for helping to protect a vehicle occupant in the event of a frontal collision. The method includes determining a passive safety crash mode classification in response to crash signals received in response to the occurrence of a crash event. The method also includes determining an active safety crash mode classification in response to active safety signals received prior to the occurrence of the crash event. The method also includes determining an active safety confidence factor for the active safety crash mode classification. The method also includes determining the weighted crash mode classification as being the active crash mode classification in response to the active safety confidence factor exceeding a predetermined confidence value. The method further includes determining the (Continued)

weighted crash mode classification as being the passive crash mode classification in response to the active safety confidence factor not exceeding the predetermined confidence value.

19 Claims, 15 Drawing Sheets

(51) Int. Cl.
  B60R 21/0134 (2006.01)
  B60R 21/00 (2006.01)
(52) U.S. Cl.
  CPC ............ *B60R 2021/0004* (2013.01); *B60R 2021/01313* (2013.01)

(56) References Cited

U.S. PATENT DOCUMENTS

| | | | | |
|---|---|---|---|---|
| 7,147,246 | B2* | 12/2006 | Breed | B60R 21/0152 |
| | | | | 280/739 |
| 7,164,117 | B2* | 1/2007 | Breed | B60R 21/0152 |
| | | | | 250/221 |
| 8,525,728 | B2* | 9/2013 | Landmark | G06V 20/58 |
| | | | | 701/28 |
| 9,626,763 | B1* | 4/2017 | Hoye | B60R 1/10 |
| 9,646,428 | B1* | 5/2017 | Konrardy | G08B 25/08 |
| 9,650,006 | B2* | 5/2017 | Foo | B60R 21/0132 |
| 9,934,625 | B1* | 4/2018 | Wahba | G07C 5/008 |
| 9,940,834 | B1* | 4/2018 | Konrardy | G08G 1/165 |
| 9,972,054 | B1* | 5/2018 | Konrardy | G06Q 40/00 |
| 10,293,836 | B2* | 5/2019 | Laakmann | G06V 20/59 |
| 2003/0097212 | A1* | 5/2003 | Feser | G01P 15/18 |
| | | | | 180/282 |
| 2004/0117086 | A1* | 6/2004 | Rao | B60R 21/0134 |
| | | | | 180/271 |
| 2006/0095183 | A1* | 5/2006 | Schuller | B60R 21/0132 |
| | | | | 701/45 |
| 2007/0227799 | A1* | 10/2007 | Watzka | B60R 21/0132 |
| | | | | 180/274 |
| 2007/0228704 | A1* | 10/2007 | Cuddihy | B60R 21/0134 |
| | | | | 280/742 |
| 2008/0190224 | A1* | 8/2008 | Song | E05F 15/40 |
| | | | | 74/42 |
| 2009/0138160 | A1* | 5/2009 | Iyoda | B60R 21/0136 |
| | | | | 701/45 |
| 2010/0019546 | A1* | 1/2010 | Stephens | B62D 39/00 |
| | | | | 296/68.1 |
| 2010/1068965 | | 7/2010 | Doerr et al. | |
| 2012/0191303 | A1* | 7/2012 | Bullinger | B60R 21/0134 |
| | | | | 701/45 |
| 2012/0304915 | A1* | 12/2012 | Yu | A47B 95/043 |
| | | | | 116/202 |
| 2012/0330512 | A1* | 12/2012 | Mahlisch | B60R 21/0134 |
| | | | | 701/45 |
| 2015/0343977 | A1* | 12/2015 | Jeong | B60R 21/0132 |
| | | | | 701/45 |
| 2016/0185278 | A1* | 6/2016 | Kuo | B60Q 1/20 |
| | | | | 362/466 |
| 2020/0066158 | A1* | 2/2020 | Park | G06N 5/04 |
| 2020/0198628 | A1* | 6/2020 | Matsunaga | B60W 30/09 |
| 2020/0317216 | A1* | 10/2020 | Konrardy | B60W 30/182 |
| 2021/0039639 | A1* | 2/2021 | Song | G01C 21/3415 |
| 2021/0291768 | A1* | 9/2021 | Balasubramanian | B60R 21/0132 |

FOREIGN PATENT DOCUMENTS

| | | | | |
|---|---|---|---|---|
| CN | 113329915 | A | * | 8/2021 |
| CN | 114475503 | A | * | 5/2022 |
| DE | 102006041725 | A1 | | 5/2007 |
| DE | 102009012407 | B3 | * | 8/2010 ......... B60R 21/0134 |
| DE | 102013012778 | A1 | | 2/2015 |
| DE | 102016218549 | B3 | | 12/2017 |
| EP | 1569160 | | * | 8/2005 |
| EP | 1839960 | | * | 10/2007 |

OTHER PUBLICATIONS

"Hazard Detection for Motorcycles via Accelerometers: A Self-Organizing Map Approach;" Donald Selmanaj, Matteo Como, Sergio M. Savaresi; IEEE Transactions on Cybernetics (vol. 47, Issue: 11, pp. 3609-3620); Nov. 3, 2017. (Year: 2017).*

* cited by examiner

VEHICLE SAFETY SYSTEM AND METHOD IMPLEMENTING WEIGHTED ACTIVE-PASSIVE CRASH MODE CLASSIFICATION

BACKGROUND

Modern vehicles include various systems for helping to provide occupant safety. These vehicle safety systems can include passive safety systems and/or active safety systems. Generally speaking, passive safety systems are reactive systems that provide occupant protection in response to detecting the occurrence of an event for which occupant protection is desired, such as a vehicle crash. Active safety systems, on the other hand, strive to anticipate the occurrence of events for which occupant protection is desired and take active avoidance measures.

Passive safety systems include one or more passive restraints, such as airbags and seatbelt retractors, that are actuatable to help protect an occupant of a vehicle. These vehicle safety systems utilize an airbag control unit that is operatively connected to the airbags and to a variety of crash sensors, such as accelerometers and pressure sensors. In response to determining a crash scenario based on information provided by the crash sensors, the airbag control unit is operative to deploy the airbags by activating an inflator that directs inflation fluid into the airbags. When inflated, the driver and passenger airbags help protect the occupant from impacts with parts of the vehicle such as the instrument panel and/or a steering wheel of the vehicle.

Active safety systems utilize sensing devices, such as cameras, radar, lidar, and ultrasonic transducers to determine the conditions around the vehicle. In response to the sensed conditions, vehicle warning systems can provide visual, audible, tactile warnings to the driver. This can be the case, for example, with blind-spot detection, lane departure, front/rear object detection, cross traffic detection, pedestrian detection. Active safety systems can also use the sensed conditions to actively actuate vehicle controls, such as active cruise control, active braking, active steering in response to lane departure detection, etc. The sensing devices utilized in active safety systems each have certain advantages.

Cameras are very effective at object detection. When arranged to view from several angles, cameras supply the vehicle with information that can be used by artificial intelligence algorithms of vehicle safety systems to detect external objects, such as other vehicles, pedestrians, or objects, such as trees or garbage cans, along the side of the road. Cameras can measure angles precisely, which allows the vehicle safety system to recognize early on whether an approaching object will come into the vehicle's path. Utilizing both long and short range zoom in combination with varying degrees of wide and narrow fields of vision, cameras become important tools for safety features such as collision avoidance, adaptive cruise control, automated braking systems, and the lane keeping assist functions.

Radar sensors use an echo system to detect objects, which is beneficial in case of poor visibility, which can detract from the camera's effectiveness. Radar sensors emit electromagnetic waves and receive the "echo" that is reflected back from the surrounding objects. Radar sensors are especially effective in determining the distance and the speed of objects, such as vehicles and pedestrians, relative to the vehicle. Functioning regardless of weather, light or visibility conditions, radar sensors are ideal for maintaining distances, issuing collision warnings, blind-spot detection, emergency braking, etc.

Lidar sensors also apply the echo principle, using laser pulses instead of radio waves. Lidar sensors record distances and relative speeds with an accuracy on par with radar. Additionally, lidar sensors can also recognize object types and angles between objects with a much higher level of accuracy. Lidar sensors can therefore be utilized to recognize more complex traffic situations very well, even in the dark. Unlike cameras and radar sensors, the angle of view is not critical because lidar sensors can record the 360-degree environment of the vehicle. The high-resolution 3D solid state lidar sensors can even render pedestrians and smaller objects three dimensionally.

SUMMARY

The invention relates to a vehicle safety system that includes both active and passive components. In this description, "active safety" is used to refer to technology assisting in the prevention of a crash, i.e., "crash avoidance," and "passive safety" is used to refer to components of the vehicle, such as airbags, seatbelts, and the physical structure of the vehicle (e.g., crumple zones) that help to protect occupants in response to detecting the occurrence of a crash.

The passive safety system includes one or more sensors, such as accelerometers and/or pressure sensors, that are configured to sense the occurrence of a crash event. A controller is configured to receive signals from the sensors, determine or discriminate the occurrence of a collision based on the signals, and to deploy one or more actuatable restraints, such as airbags and/or seatbelt pretensioners/retractors, in response to the sensed collision.

The active safety system is designed to prevent or reduce the severity of a vehicle crash by using radar (all-weather), laser (LIDAR), camera (employing image recognition), or a combination thereof, to detect an imminent crash. In response to detecting an imminent crash, the active safety system provides crash avoidance features, such as operator warnings (visual, audible, tactile) and active safety measures, such as automatic emergency braking and/or automatic emergency steering to help avoid or mitigate the crash.

The active safety system can be a standalone system or can be a subsystem utilizing components of another system, such as a driver assist system (DAS), which utilized the camera, radar, LIDAR data to provide driver assistance functions, such as active cruise control, lane departure, blind spot monitoring, parking assist, etc. These components can even be used to provide automated driving capabilities.

According to the invention, information obtained from an active safety system is combined with information obtained from a passive safety system in order to improve the classification of a frontal crash by determining a weighted crash mode classification.

According to one aspect, a method for helping to protect a vehicle occupant in the event of a frontal collision includes determining a passive safety crash mode classification in response to crash signals received in response to the occurrence of a crash event. The method also includes determining an active safety crash mode classification in response to active safety signals received prior to the occurrence of the crash event. The method also includes determining an active safety confidence factor for the active safety crash mode classification. The method also includes determining the weighted crash mode classification as being the active crash mode classification in response to the active safety confidence factor exceeding a predetermined confidence value. The method further includes determining the weighted crash mode classification as being the passive crash mode classification in response to the active safety confidence factor not exceeding the predetermined confidence value.

According to another aspect, alone or in combination with any other aspect, the method can also include determining the occurrence of a frontal collision in response to the crash signals, and actuating a vehicle occupant protection device according to the weighted crash mode classification.

According to another aspect, alone or in combination with any other aspect, determining the active safety crash mode classification can include estimating collision characteristics in response to the active safety signals.

According to another aspect, alone or in combination with any other aspect, estimating the collision characteristics can include identifying an object in a field of view of the active safety sensors and, for that object, determining a time to collision of the vehicle with the object, determining a relative velocity between the vehicle and the object, and determining an overlap ratio between the vehicle and the object.

According to another aspect, alone or in combination with any other aspect, identifying an object in the field of view of the active safety sensor can include determining the object closest to the vehicle.

According to another aspect, alone or in combination with any other aspect, determining the time to collision can include estimating a minimum time to collision and a maximum time to collision using predetermined acceleration and deceleration values for the vehicle and target.

According to another aspect, alone or in combination with any other aspect, determining the relative velocity can include estimating a minimum relative velocity and a maximum relative velocity using predetermined acceleration and deceleration values for the vehicle and target.

According to another aspect, alone or in combination with any other aspect, wherein determining the overlap ratio can include: determining the width of the vehicle and the width of the object, determining the lateral distance between longitudinal centerlines of the vehicle and the object, determining the overlap as the sum of one-half the vehicle width, one-half the object width, and the lateral distance between longitudinal centerlines of the vehicle and the object.

According to another aspect, alone or in combination with any other aspect, determining the lateral distance between the longitudinal centerlines of the vehicle and the object can include estimating minimum and maximum lateral distances between the longitudinal centerlines of the vehicle and the object.

According to another aspect, alone or in combination with any other aspect, estimating minimum and maximum lateral distances between the longitudinal centerlines of the vehicle and the object can include estimating a change in lateral distance as a function of the vehicle speed, steering angle, and yaw rate.

According to another aspect, alone or in combination with any other aspect, determining the overlap ratio can include determining an impact side of the vehicle as being a left/driver side or right/passenger side of the vehicle.

According to another aspect, alone or in combination with any other aspect, the method can also include determining whether a collision is imminent in response to the time to collision being less than a threshold value.

According to another aspect, alone or in combination with any other aspect, the method can also include determining the active safety crash mode classification in response to determining that a collision is imminent, the impact side of the vehicle, an overlap classification, and a velocity classification.

According to another aspect, alone or in combination with any other aspect, the overlap classification can include one of an asymmetric classification, a symmetric (full overlap) classification, an offset deformable barrier (ODB) classification, and a small overlap classification.

According to another aspect, alone or in combination with any other aspect, the velocity classification can include one of a high speed and low speed classification.

According to another aspect, alone or in combination with any other aspect, determining the active safety crash mode classification can include determining, in response to active safety signals, at least one of a longitudinal distance between the vehicle and the object, a lateral distance between a centerline of the vehicle and the object, a range between the vehicle and the object, an angle of approach between the vehicle and the object, and a velocity of the vehicle relative to the object;

According to another aspect, alone or in combination with any other aspect, a vehicle safety system for helping to protect a vehicle occupant in the event of a frontal collision can include an actuatable safety device and a controller for controlling actuation of the safety device according to the aforementioned methods.

According to another aspect, alone or in combination with any other aspect, the vehicle safety system can include one or more passive sensors for providing the crash signals to the controller, and one or more active sensors for sensing an object in the path of the vehicle and providing the active safety signals to the controller.

According to another aspect, alone or in combination with any other aspect, the one or more active sensors can include at least one of a camera, a radar sensor, and a laser radar (LIDAR) sensor.

According to another aspect, alone or in combination with any other aspect, the controller can include an airbag controller unit (ACU).

According to another aspect, alone or in combination with any other aspect, a vehicle can include the vehicle safety system.

DRAWINGS

DESCRIPTION

In this description, reference is sometimes made to the left and right sides of a vehicle. These references should be understood as being taken with reference to the forward direction of vehicle travel. Thus, reference to the "left" side of a vehicle is meant to correspond to a driver side ("DS") of the vehicle. Reference to the "right" side of the vehicle is meant to correspond to a passenger side ("PS") of the vehicle.

Also, in this description, certain descriptions are made with respect to vehicle axes, specifically, the X-axis, Y-axis, and Z-axis of the vehicle. The X-axis is a central, longitudinally extending axis of the vehicle. The Y-axis is a laterally extending axis of the vehicle that is perpendicular to the X-axis. The Z-axis is a vertically extending axis of the vehicle that is perpendicular to both the X-axis and Y-axis. The X-axis, Y-axis, and Z-axis intersect at or approximate to a center of gravity ("COG") of the vehicle.

Vehicle Safety System

Figure 1:
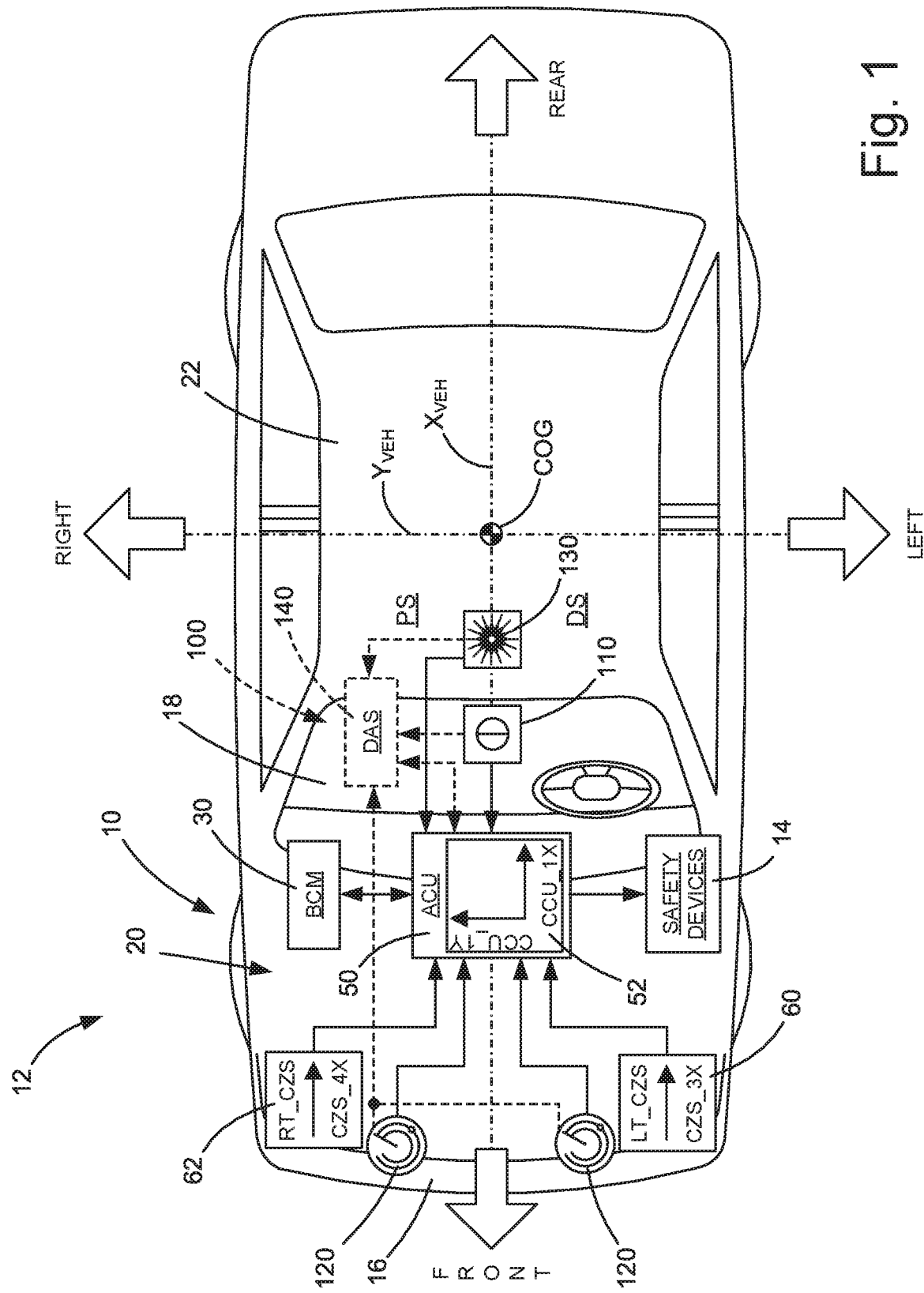
FIG. 1 is a schematic illustration of a vehicle including a vehicle safety system, according to one example configuration.

Referring to FIG. 1, by way of example, a vehicle 12 includes a vehicle safety system 10, which includes a passive safety system 20 and an active safety system 100. The passive safety system 20 includes actuatable vehicle occupant protection devices, which are illustrated schematically at 14. The protection devices 14 can include any actuatable vehicle occupant protection device, such as frontal airbags, side airbags, curtain air bags, knee bolster air bags, and actuatable seatbelt pre-tensioners and/or retractors. The passive safety system 20 also includes an airbag electronic control unit (referred to herein as an airbag controller unit or "ACU") 50 that is operatively connected to the protection devices 14. The ACU 50 is operative to control the actuation of the protection devices 14 in response to vehicle conditions sensed via one or more sensors to which the ACU is operatively connected.

The passive safety system 20 includes several sensors, such as accelerometers and/or pressure sensors, for measuring certain conditions of the vehicle 12 that are utilized to determine whether to actuate the vehicle occupant protection devices 14. These sensors can be mounted at various locations throughout the vehicle 12 selected to allow for sensing the particular vehicle condition for which the sensor is intended. In this description, the vehicle safety system 10 is described as including several crash sensors of different types and locations in the vehicle 12. The crash sensors described herein are not necessarily a complete list of sensors included in the vehicle safety system 10; they are only those utilized by the invention to detect the occurrence of a front impact. Those skilled in the art will therefore appreciate that the vehicle safety system 10 can include one or more other crash sensors of any type, in any number, and in any location in the vehicle 12.

The passive safety system 20 is configured to detect the occurrence of a frontal vehicle impact utilizing a left crush zone sensor 60 and a right crush zone sensor 62. The left and right crush zone sensors 60, 62 are accelerometers configured to sense vehicle accelerations and transmit signals indicative of those accelerations to the ACU 50. The ACU 50 is configured to determine whether the magnitude of the sensed accelerations meets or exceeds a threshold sufficient to indicate that a frontal crash event has taken place and to actuate the protection devices 14 in response to that determination.

In FIG. 1, the crush zone sensors 60, 62 are single axis accelerometers configured to detect accelerations in directions parallel to the longitudinal axis $X_{VEH}$, which are indicated generally by the arrows LT_CZS and RT_CZS, respectively, as shown in the schematic representations of the sensors. The left and right crush zone sensors 60, 62 are positioned at or near the left, driver side (DS) front corners, and right, passenger side (PS) front corners, respectively, of the vehicle 12. The left and right crush zone sensors 60, 62 can, for example, be mounted behind a front bumper 16 of the vehicle at these front corner locations. The ACU 50 includes an integrated 2-axis accelerometer 52 for sensing vehicle accelerations along the X-axis and Y-axis. These accelerations are shown at CCU_1X and CCU_1Y, respectively.

The vehicle safety system 10 is implemented and configured to cooperate with other vehicle systems. For example, the ACU 50 can be operatively connected to a vehicle body control module (BCM) 30 via a vehicle controller area network (CAN) bus. The BCM 30 can communicate via the CAN bus with other vehicle systems, such as chassis control, stability control, traction/skid control, anti-lock braking (ABS), tire pressure monitoring (TPMS), navigation systems, instrumentation (speed, throttle position, brake pedal position, etc.), information and entertainment ("infotainment") systems, and other systems. Through these interfaces, the ACU 50 can communicate with any of these external systems to provide and/or receive data.

Referring still to FIG. 1, the active safety system 100 can be of a known configuration, including one or more active safety system components configured to provide active safety functionality in a known manner. The active safety system 100 can utilize components of a driver assist system (DAS), which, as the name implies, provide assistance to the vehicle operator while driving. These components can help provide DAS functionality, such as such active cruise control, lane departure, blind spot monitoring, parking assist, etc. These components can even be those used to provide automated driving capabilities and therefore can provide vast amounts of information regarding the vehicle surroundings using artificial intelligence (AI) and other machine learning techniques. For crash avoidance functionality, the active safety system can provide crash warnings (audible, visual, tactile), automatic emergency braking, and automatic emergency steering.

The active safety system 100 can include various components. In the example configuration of FIG. 1, the active safety system 100 includes camera sensors, radar sensors, and laser radar (LIDAR) sensors. A camera sensor 110 is mounted in a forward-facing manner high on the windshield 18, e.g., behind or in the area of a rearview mirror. Radar sensor(s) 120 can be front mounted, in the area of the bumper 16, e.g., in the vehicle grille. A laser radar (LIDAR) sensor 130 can be mounted on or near the vehicle roof 22.

Camera sensors 110 are effective in providing a wide field-of-view, with the ability to identify various objects/obstacles with a high degree of accuracy. Cameras can also determine whether an object/obstacle is in the path of the vehicle 12. Cameras, however, also require good visibility and suffer in dark conditions, fog, rain, snow, etc. Radar sensors 120 do not suffer in poor visibility conditions and do provide accurate indications of time-to-collision (TTC). Radar sensors 120 are, however, less capable in terms of discerning between different types of objects/obstacles and are not as adept as cameras in determining whether an object/obstacle is in the path of the vehicle 12. LIDAR sensors 130 provide 3-D sensing capability for TTC and vehicle path determination, provide good object/obstacle recognition, and are robust in both good and poor visibility situations.

The camera 110, radar sensor 120, and LIDAR sensor 130 can be connected to a separate controller, such as a DAS controller 140, and that controller can communicate with the ACU 50 via the CAN bus. Alternatively, both the active and passive safety functionality can be handled by a single controller, such as the ACU 50, in which case, the camera 110, radar sensor 120, and LIDAR sensor 130 can be connected directly to the ACU 50. These sensors monitor an area in front of the vehicle 12, within a predetermined field of view and range of the vehicle.

The active safety system sensors provide information (signals, data, etc.) that a controller, such as the ACU 50, DAS controller 140, or other controller, can use to detect the presence of objects in the vehicle path. Implementing known methods, such as artificial intelligence (AI) and other algorithms, the controller can determine information related to the detected object, such as the object type, distance from the vehicle, lateral position in the vehicle path, time to collision with the vehicle, relative velocity with the vehicle, state of the object (e.g., forward-facing, backward-facing, sideways-facing, moving, stationary, etc.), and the probability that a collision will occur.

Active Safety System Sensed Parameters

Figure 2:
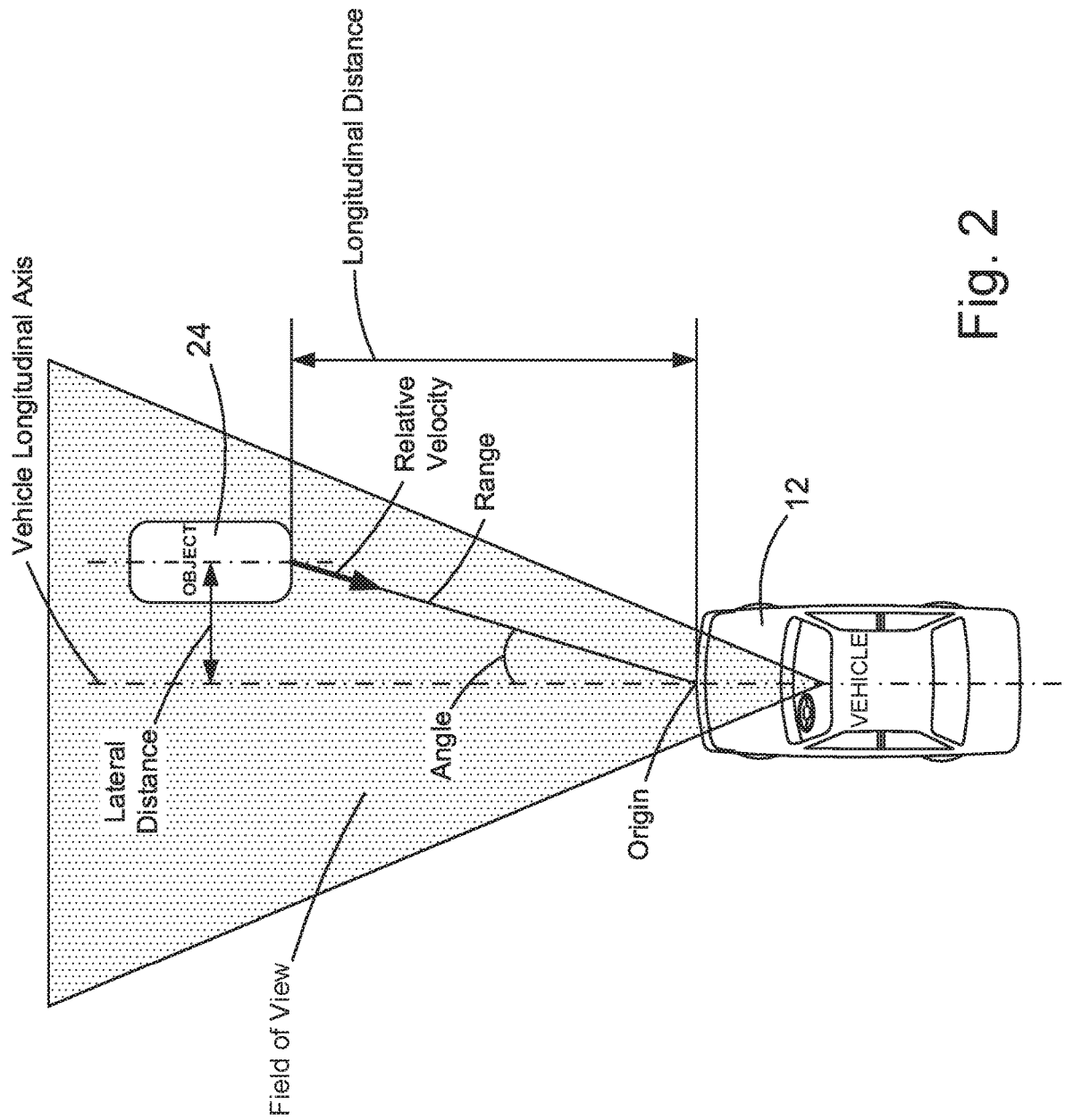
FIG. 2 is a schematic illustration of a vehicle relative to an object and showing the various parameters that can be sensed via an active safety system portion of the vehicle safety system.

FIG. 2 illustrates some of the parameters that can be sensed via the active safety system 100. The parameters illustrated in FIG. 2 are those associated with an object 24 and the object's position with respect to the vehicle 12. These parameters are sensed with respect to an origin, which is positioned at the front of the vehicle 12 and centered on a longitudinal axis of the vehicle. The active sensor may not be positioned at the origin. This can be the case, for example, where the active sensor is a rearview mirror mounted camera.

The active sensor provides a field of view with respect to the vehicle. It is within this field of view that the active sensor can detect the presence of an object and provide parameters associated with the object. These parameters include a longitudinal distance between the object and the vehicle origin, and a lateral distance between the object and the vehicle longitudinal axis. A range of the object is the straight line distance from the vehicle origin and the object at the object centerline. When the object is offset from the vehicle longitudinal axis, the range extends at an angle relative to the vehicle longitudinal axis. The relative velocity between the vehicle and the object is measured along the range.

FIGS. 3-15 illustrate control algorithms implemented by the vehicle safety system 10 to help protect vehicle occupant(s) in the event of a frontal impact with the vehicle 12, referred to herein as a front or frontal crash. The algorithms are implemented in a vehicle controller, such as the ACU 50, which is operatively connected to the safety devices 14 and is configured to actuate the safety devices in response detecting the occurrence of a frontal crash. According to the invention, the control algorithms implemented in the vehicle safety system 10 are configured so that the passive safety system 20 adjusts or tailors its response to a frontal crash based on information obtained from the active safety system 100.

Control Algorithm Overview

Figure 3:
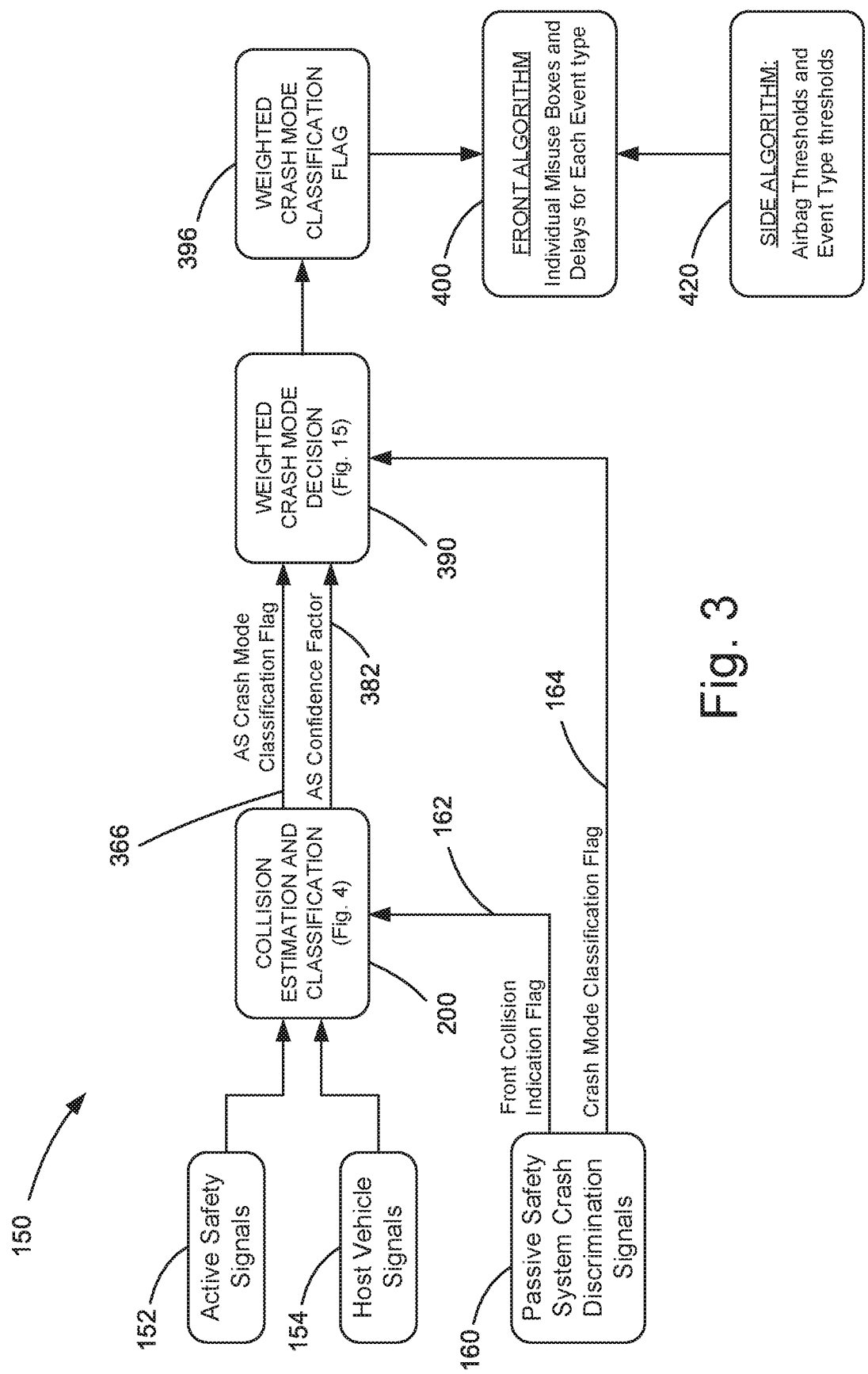
FIGS. 3-15 are schematic diagrams illustrating control algorithms implemented in the vehicle safety system.

FIG. 3 illustrates an overview of the control algorithm 150 implemented by the vehicle safety system 10 to help protect vehicle occupant(s) in response to detecting the occurrence of a frontal crash. The control algorithm 150 implements a novel method for classifying the detected frontal crash. The control algorithm 150 is configured to determine a weighted crash mode classification flag 376 in response to the detection of a frontal vehicle crash. The weighted crash mode classification flag 376 is a frontal crash mode determination (i.e., symmetric, asymmetric, offset deformable barrier (ODB), small overlap, etc.) that utilizes information obtained from both the active safety system 100 and the passive safety system 20. As discussed herein, the control algorithm 150 implements a unique weighting algorithm by which the active and passive crash mode determinations are blended to determine a weighted crash mode classification.

As shown in FIG. 3, the control algorithm 150 utilizes active safety signals 152 from the active safety system 100. The control algorithm 150 also utilizes passive safety system crash discrimination signals 160, specifically a front collision indication flag 162 and a crash mode classification flag 164. The preset algorithms 160 include collision estimation and classification algorithms 200 and weighted crash mode decision algorithms 390, which produce the weighted crash mode classification flag 396. The weighted crash mode classification flag 396 is provided to a front algorithm 400, which can also be informed by a side algorithm 420. The front algorithm 400 uses the weighted crash mode classification flag 396 to determine thresholds, misuse boxes, and delays that are implemented to determine whether to deploy the safety devices 14 in response to the classified crash event.

Collision Estimation and Classification Algorithm Overview

Figure 4:
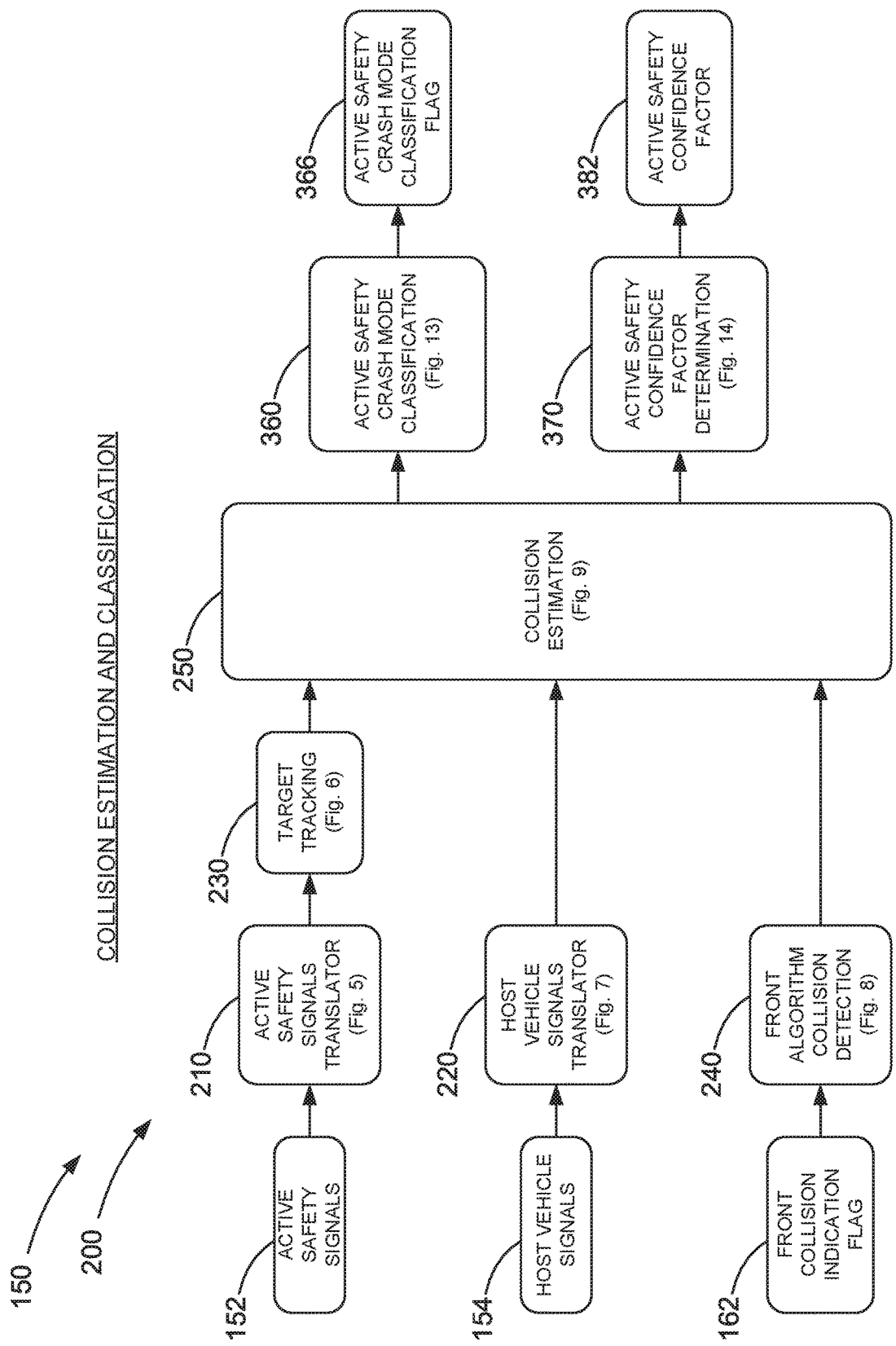

FIG. 4 illustrates an overview of the collision estimation and classification algorithm 200 portion of the control algorithm 150 implemented by the vehicle safety system 10. As shown in FIG. 4, the active safety signals 152 are provided to an active safety system signal translator 210. The translated active safety signals are provided to target tracking algorithms 230, which track the position of the target 24 relative to the vehicle 12 and produce the output of which is used in a collision estimation algorithm 250. The host vehicle signals 154 are provided to a host vehicle signal translator 220. The translated host vehicle signals are provided to the collision estimation algorithm 250. The front collision indication flags 162 are provided to a front collision detection algorithm 240, the output of which is also provided to the collision estimation algorithm.

The front collision indication flags 162 can be obtained from front crash discrimination algorithm(s) implemented by the vehicle safety system 10. The front crash discrimination algorithms implemented by the vehicle safety system 10 can, for example, be one or more of those disclosed in U.S. Pat. No. 9,650,006 B2 to Foo et al., the disclosure of which is hereby incorporated by reference in its entirety. Because of this, it will be appreciated that the vehicle safety system 10 can include the components, or portions thereof, disclosed in the aforementioned U.S. Pat. No. 9,650,006 B2 to Foo et al.

The collision estimation algorithm 250 estimates the characteristics of the crash based on the information obtained from the target tracking algorithms 230, host vehicle signal translators 220, and front collision detection algorithm 240. The collision estimation algorithm 250 provides these estimated characteristics to an active safety crash mode classification algorithm 360, which classifies the frontal collision and provides an active safety crash mode classification flag 366 indicative of the determined crash mode classification.

Active Safety Signal Translator

Figure 5:
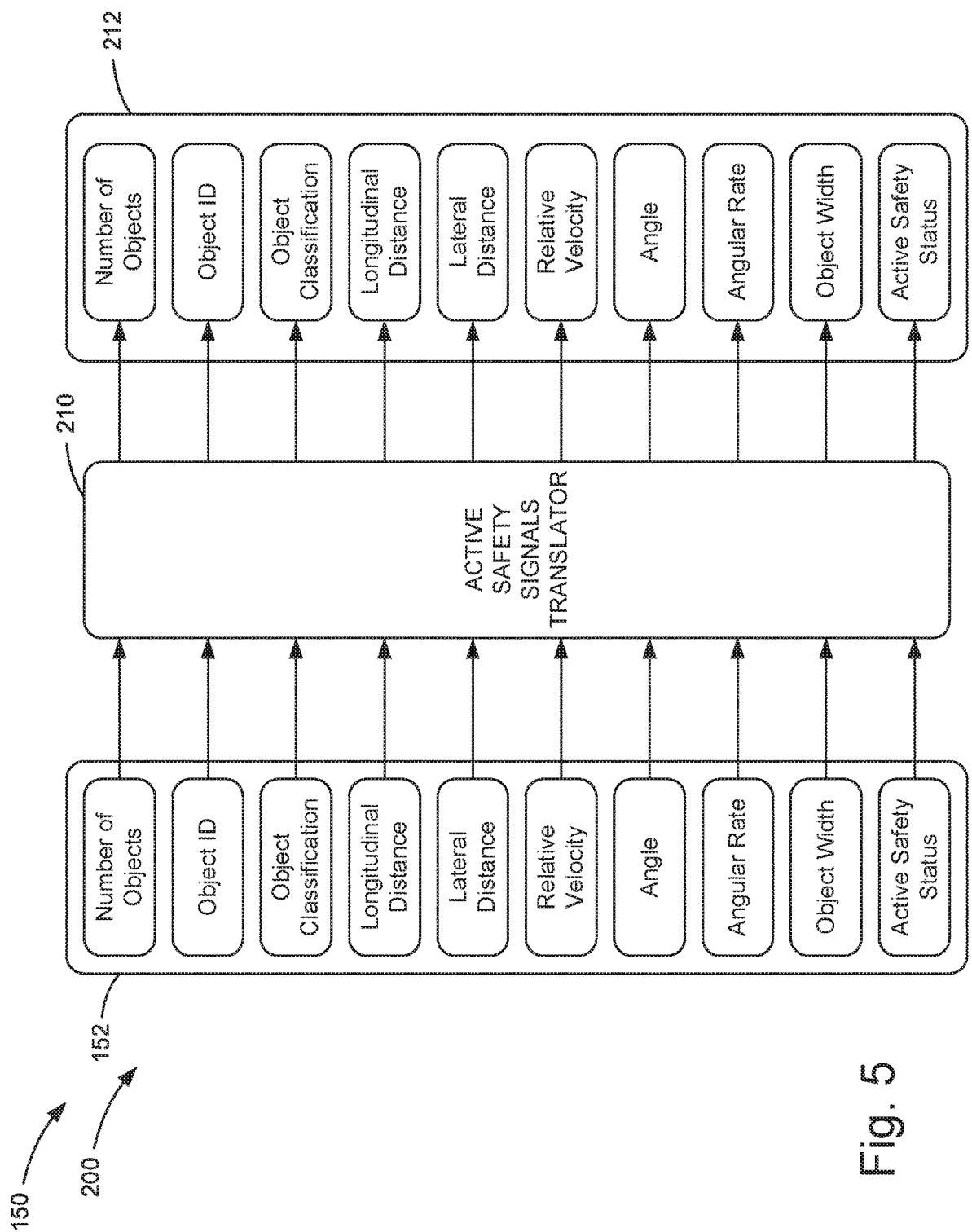

The active safety signal translator 200 is illustrated in FIG. 5. The active safety signal translator 200 translates active safety signals 152 that are vehicle or platform specific so that the collision estimation and crash mode classification functions can be performed using normalized values. This can include translating vehicle coordinate systems to algorithm coordinate systems, scaling, signage (+/−), signal ranges, units, etc. For instance, some active safety systems use positive and negative values (+/−) to indicate driver side/passenger side values. This can be the case, for example, with lateral values, such as distance, speed, acceleration, angle, etc. Which side is positive (+) and which is negative (−), however, can be different among different vehicle platforms. The active safety signal translator 200 translates these values so that they are normalized and follow the same convention consistently in order to ensure the accuracy of the control algorithm 150.

Additionally, some vehicle platforms might not directly provide all of the active safety system signals 152 necessary to implement the control algorithm 150. In this instance, the active safety system translator 200 can serve to calculate the missing signals/values.

FIG. 5 illustrates some of the active safety signals 152 that can be translated by the active safety signal translator 210. These can include: number of objects, object ID, object classification, object longitudinal distance, object lateral distance, object relative velocity, object angle, object angular rate, object width, and the status of the active safety system 100. Also, as shown in FIG. 5, the active safety signal translator 210 translates the active safety signals 152, providing corresponding signals that are conditioned, normalized, standardized, etc. to follow the conventions expected by the control algorithm 150.

Target Tracking

Figure 6:
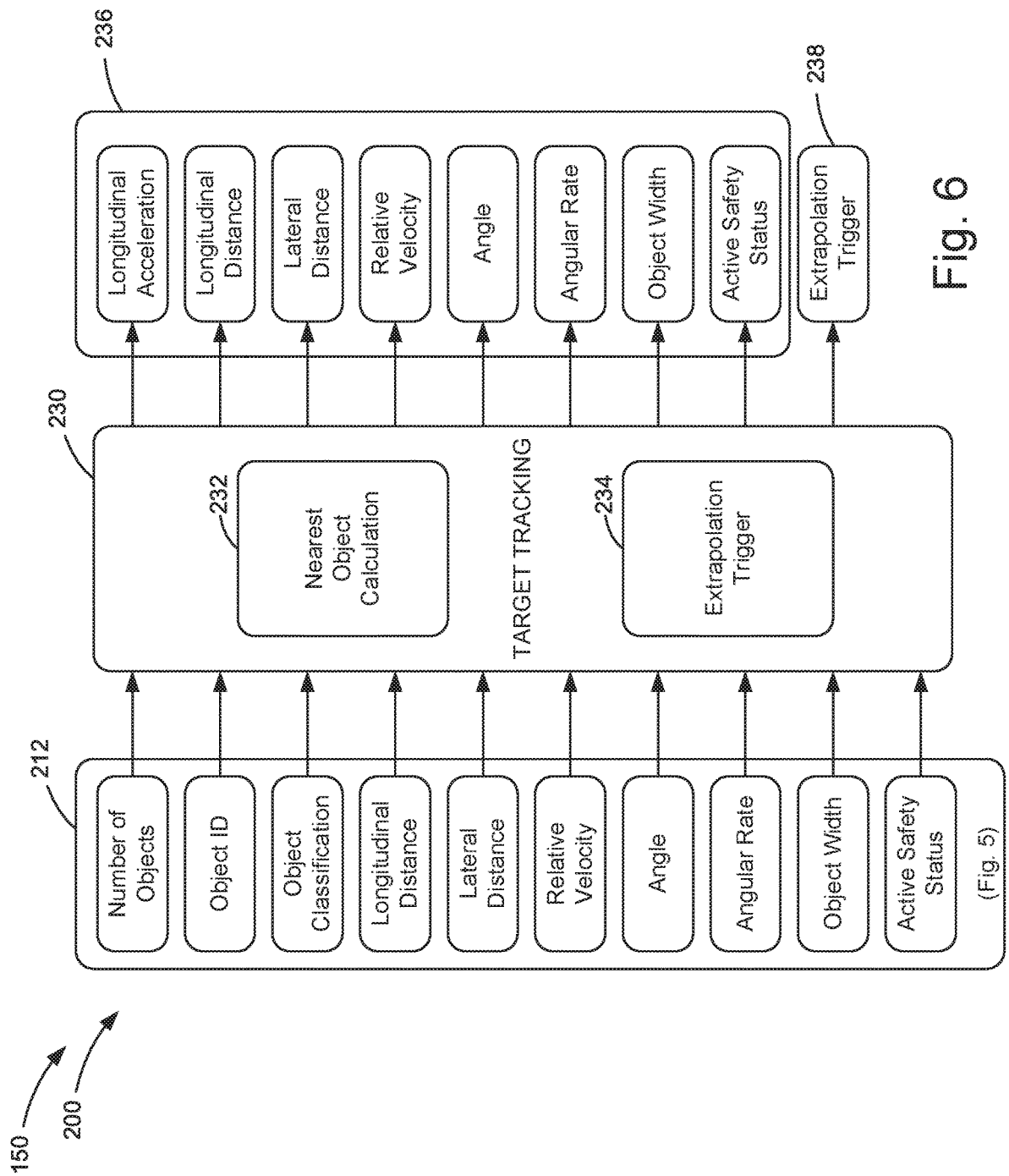

The target tracking algorithm 230 is illustrated in FIG. 6. As shown in FIG. 6, the target tracking algorithm 230 receives the translated active safety signals from the active safety signal translator 200. As shown, these active safety signals can include: number of objects, object ID, object classification, object longitudinal distance, object lateral distance, object relative velocity, object angle, object angular rate, object width, and the status of the active safety system 100.

The target tracking algorithm 230 uses this information to perform a nearest object calculation 232 in order to identify the closest object in the vehicle path, when more than one objects are in the vehicle path. For the object identified as being closest, as shown to the right of FIG. 6, the target tracking algorithm 230 can determine the following characteristics identified generally at 236: longitudinal acceleration, longitudinal distance, lateral distance, relative velocity, angle, angular rate, and the object width. The target tracking algorithm 230 can also monitor and provide the active safety system status to ensure that the data used to track the identified object is current and accurate.

The target tracking algorithm 230 also includes an extrapolation trigger 234 that is configured to trigger an extrapolation algorithm for calculating one or more of the aforementioned characteristics 236 from the host vehicle signals in the event that they cannot be obtained directly via the active safety sensors. This can be the case, for example, where the object is outside the field of view of the active safety system and below a minimum distance to the vehicle/sensor. In other words, the extrapolation trigger 234 will trigger the extrapolation of the characteristics 236 when the object is determined to be so close to the vehicle that it is or might fall out of range of the active sensors. In this instance, the extrapolation trigger 234 can trigger the calculation of the characteristics 236 of the object relative to the vehicle based on the host vehicle signals.

Host Vehicle Signal Translator

Figure 7:
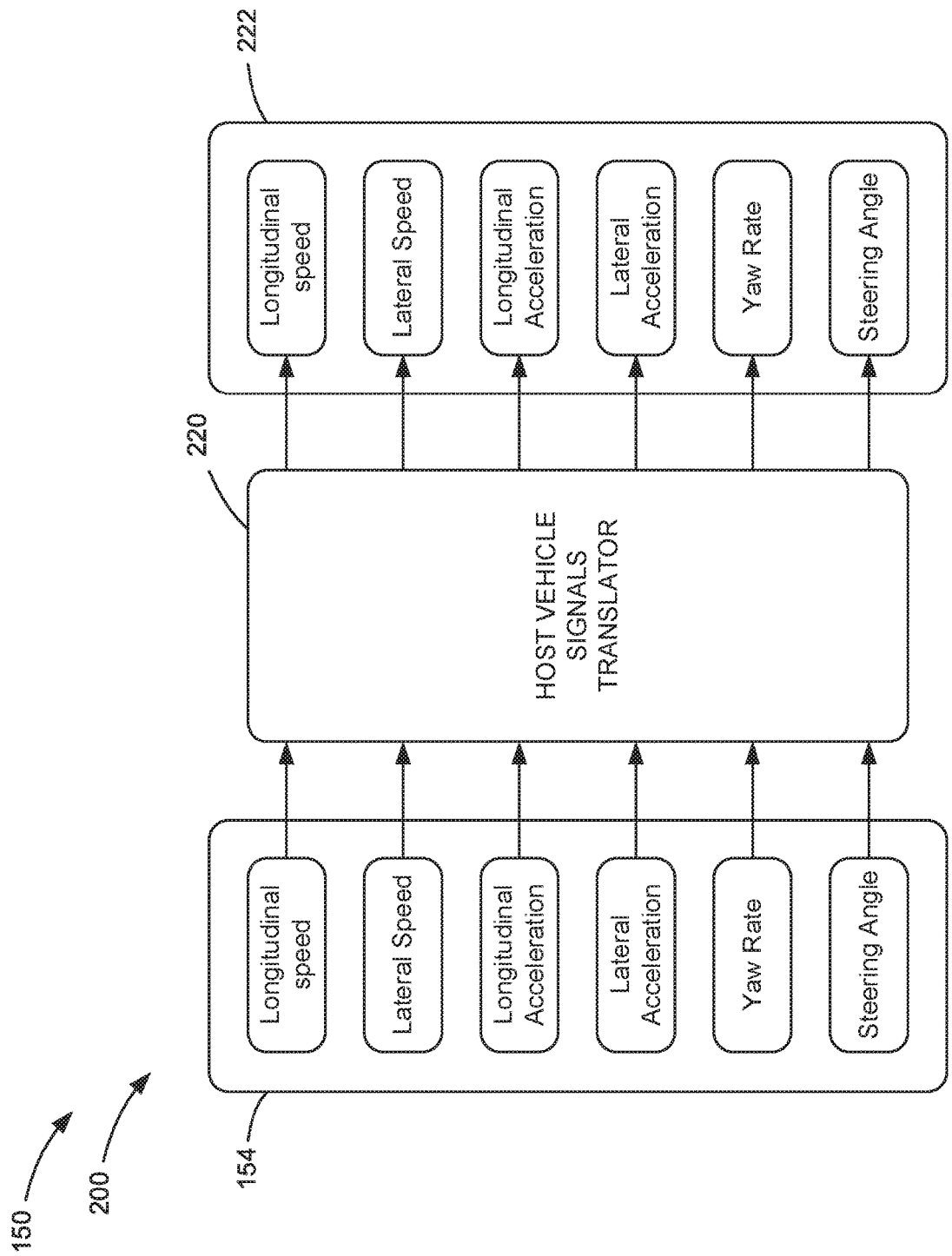

The host vehicle signal translator 220 is illustrated in FIG. 7. The host vehicle signal translator 220 translates host vehicle signals 154 that are vehicle or platform specific so that the collision estimation and crash mode classification functions can be performed using normalized values. This can include translating vehicle coordinate systems to algorithm coordinate systems, scaling values, signage (+/−), signal ranges, units, etc. For instance, some active safety systems use positive and negative values (+/−) to indicate driver side/passenger side values. This can be the case, for example, with lateral values, such as distance, speed, acceleration, angle, etc. Which side is positive (+) and which is negative (−), however, can be different among different vehicle platforms. The host vehicle signal translator 220 translates host vehicle signals 154 so that they are normalized and follow the same convention consistently in order to ensure the accuracy of the control algorithm 150.

Additionally, some vehicle platforms might not directly provide all of the host vehicle signals 154 necessary to implement the control algorithm 150. In this instance, the host vehicle system translator 220 can serve to calculate the missing signals/values.

FIG. 7 illustrates some of the host vehicle signals 154 that can be translated by the host vehicle signal translator 220. These can include: vehicle longitudinal speed, vehicle lateral speed, vehicle longitudinal acceleration, vehicle lateral acceleration, yaw rate, and steering angle. Also, as shown in FIG. 7, the host vehicle signal translator 220 translates the host vehicle signals 154, providing corresponding translated host vehicle signals 222 that are conditioned, normalized, standardized, etc. to follow the conventions expected by the control algorithm 150.

Front Collision Detection Algorithm

Figure 8:
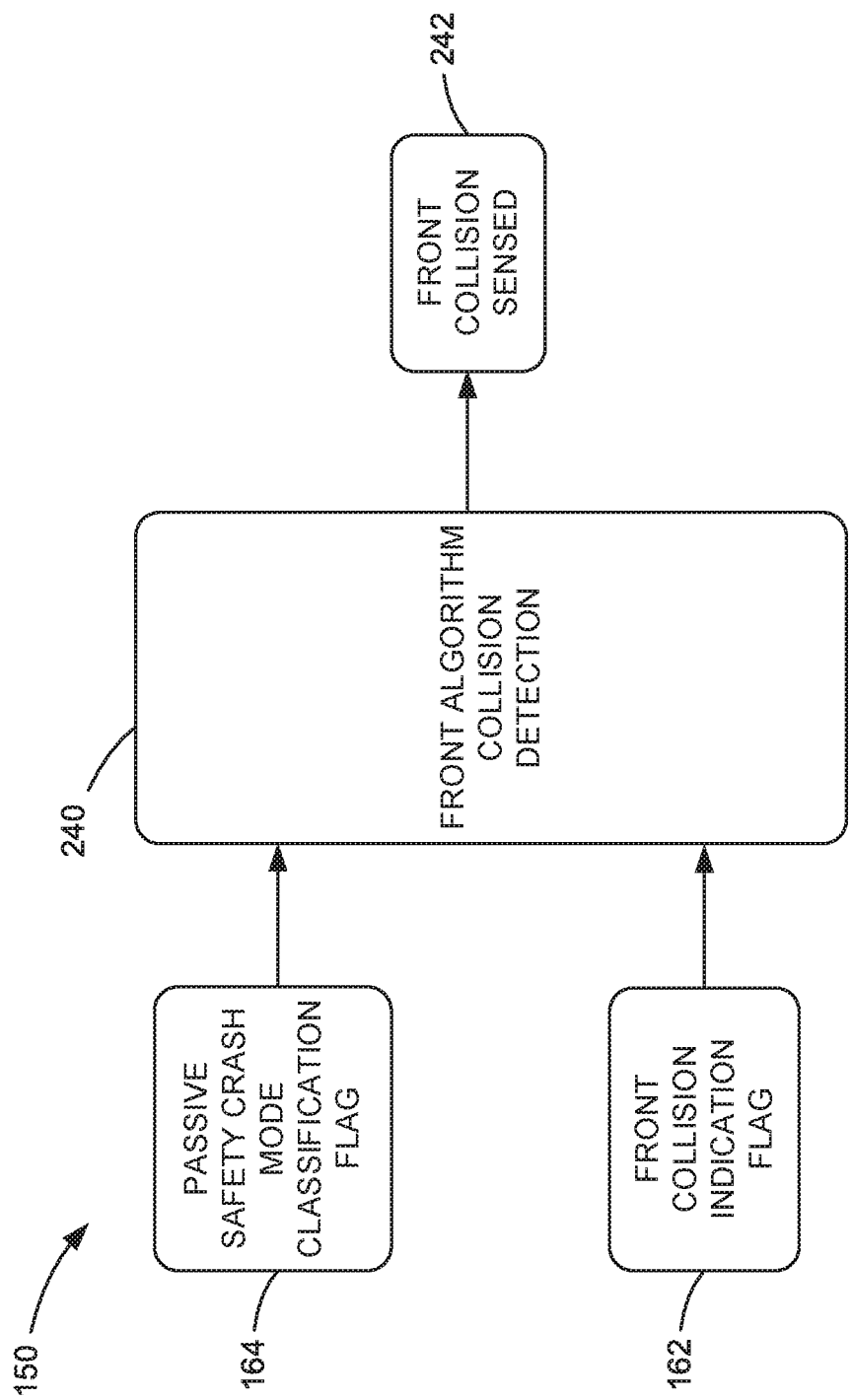

The front collision detection algorithm 240 is illustrated in FIG. 8. The front collision detection algorithm 240 is configured to provide a front collision sensed signal 242 in response to the crash mode classification flag 164 and the front collision indication flag 162 received from the passive safety system 20. The front collision sensed signal 242 is therefore an indication, derived from the passive safety system 20, that 1) a frontal crash has occurred, and 2) the type of frontal crash that has been determined by the passive safety system.

As described above, the determination of the passive safety crash mode classification can be similar or identical to the aforementioned U.S. Pat. No. 9,650,006 B2 to Foo et al. The classifications of the crash mode classification flag 164 can include any one or more of the following classifications, each of which can have thresholds that are individually configurable and/or tunable. The classifications can, for example, include full overlap symmetric, left/right (L/R) asymmetric, L/R small overlap, L/R low speed angular/oblique, L/R high speed angular/oblique, L/R low speed offset deformable barrier (ODB), L/R high speed ODB, and L/R offset moving deformable barrier (OMDB). The front collision indication flag 162 is a sensor signal indicating the occurrence of a front collision, such as a left and/or right crush zone sensor. These signals could, for example, be the CZS_3X signal from LT_CZS 60, or the CZS_4X signal from RT_CZS 62 (see FIG. 1).

Collision Estimation Algorithm

Figure 9:
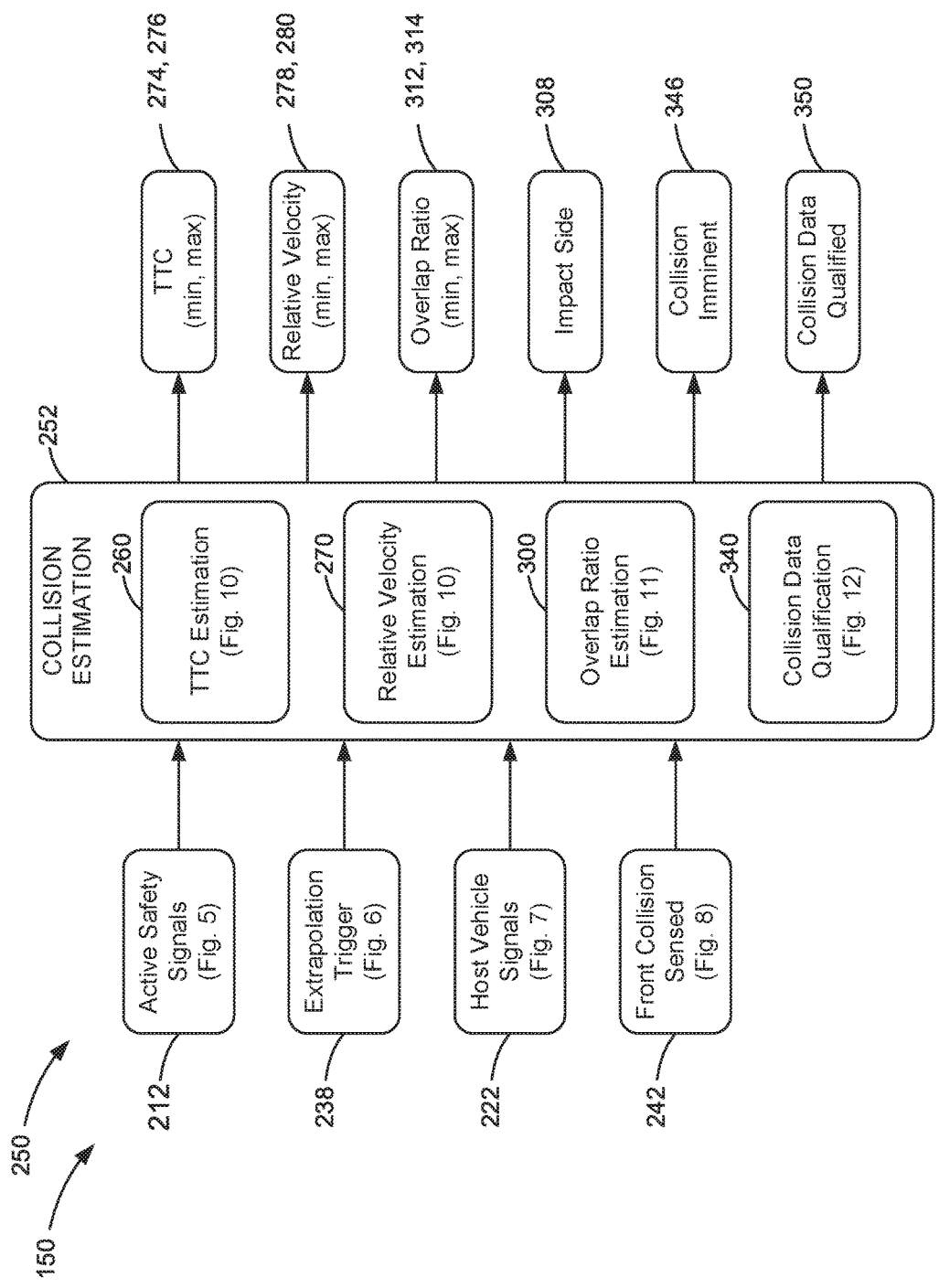

The collision estimation algorithm 250 is illustrated in FIG. 9. As shown in FIG. 9, the collision estimation algorithm 250 includes a time to collision (TTC) estimation algorithm 260, a relative velocity estimation algorithm 270, an overlap ratio estimation algorithm 300, and a collision data qualification algorithm 340. The algorithms, referred to collectively at 252, perform calculations based on the active safety signals 212, the extrapolation trigger 238, the host vehicle signals 222, and the front collision sensed indication 242. The algorithms 252 produce calculated values for $TTC_{min}$ 274, $TTC_{max}$ 276, Relative Velocity$_{min}$ 278, Relative Velocity$_{max}$ 280, Overlap Ratio$_{min}$ 312, Overlap Ratio$_{max}$ 314, impact side 308, collision imminent 346, and collision data qualified 350. The collision estimation algorithms 252 are discussed in detail in the following paragraphs.

TTC and Relative Velocity Estimation Algorithms

Figure 10:
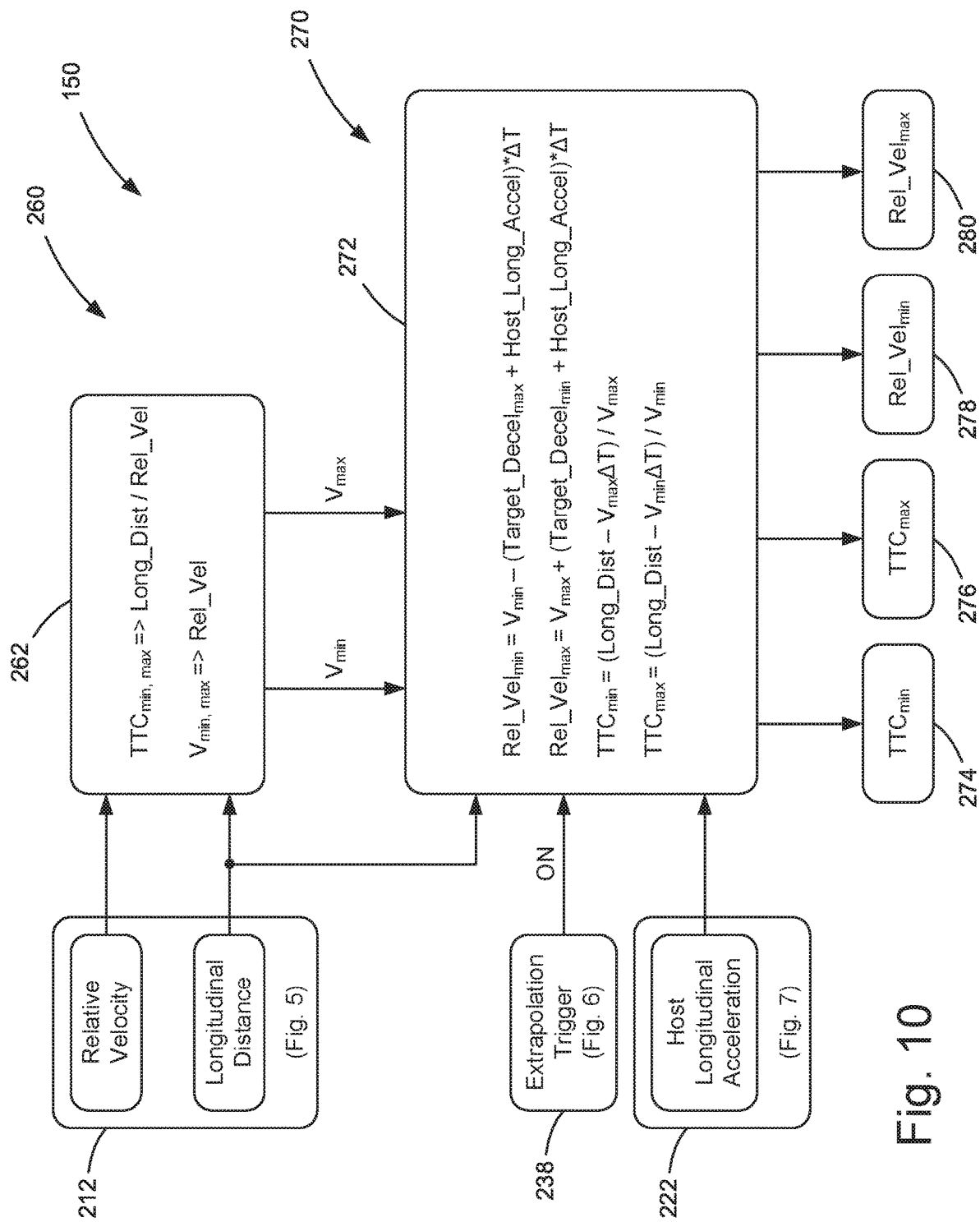

The TTC estimation algorithm 260 and relative velocity estimation algorithm 270 are shown in FIG. 10. As shown in FIG. 10, the TTC estimation algorithm 260 performs calculations at 262 based on the relative velocity between the detected object 24 and the vehicle 12 (see FIG. 2) and the longitudinal distance between the detected object and the vehicle. The relative velocity and longitudinal distance values are obtained from the active safety signals 212. As shown, the TTC calculation is obtained by dividing the longitudinal distance by the relative velocity.

For both TTC and relative velocity, minimum and maximum (min/max) values are obtained. When the object is in the field of view of the active safety system (extrapolation trigger 238=OFF), the minimum and maximum values ($TTC_{min/max}$, $V_{min/max}$) are the same. When the object is outside the field of view (extrapolation trigger 238=ON), the minimum and maximum relative velocities are estimated using calibratable min/max target deceleration levels (Target_Decel$_{min}$ and Target_Decel$_{max}$) and the host longitudinal acceleration values (from host vehicle signals 222). This is shown in the relative velocity estimation algorithm 270, specifically at block 272, where:

$$V_{min} = V_{min} - (\text{Target\_Decel}_{max} + \text{Host\_Long\_Accel}) * \Delta T; \text{ and}$$

$$V_{max} = V_{max} + (\text{Target\_Decel}_{min} + \text{Host\_Long\_Accel}) * \Delta T$$

Also, when the object is outside the field of view, $TTC_{min}$ and $TTC_{max}$ are estimated using extrapolated relative velocities. This is also shown in block 272, where:

$$TTC_{min} = (\text{Long\_Dist} - V_{max} * \Delta T)/V_{max}; \text{ and}$$

$$TTC_{max} = (\text{Long\_Dist} - V_{min} * \Delta T)/V_{min}$$

As shown in FIG. 10, the TTC estimation algorithm 260 and relative velocity estimation algorithm 270 produce values for $TTC_{min}$ 274, $TTC_{max}$ 276, (relative) $V_{min}$ 278, and (relative) $V_{max}$ 280.

Overlap Ratio Estimation Algorithm

Figure 11:
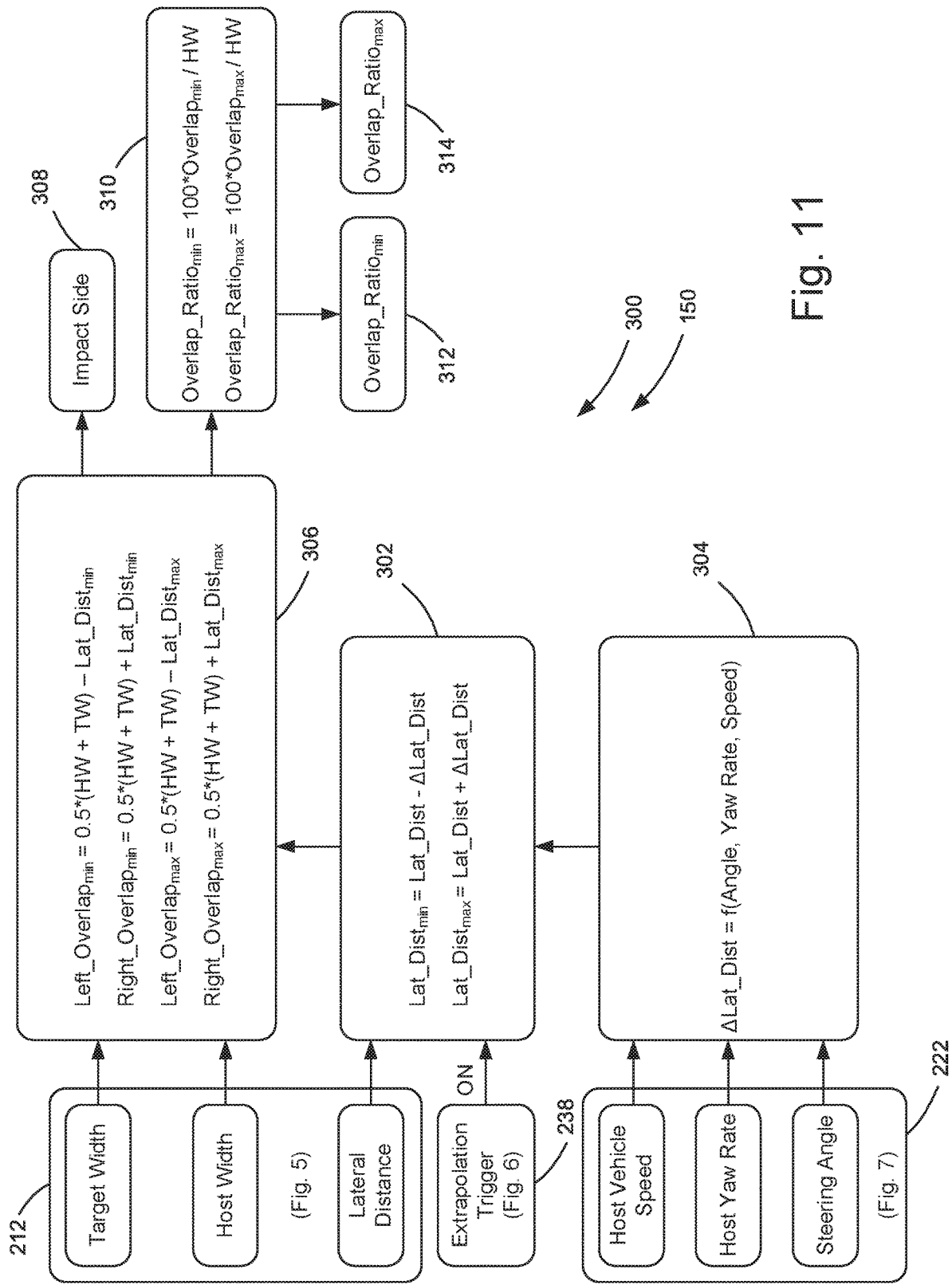

The overlap ratio estimation algorithm 300 is shown in FIG. 11. As shown in FIG. 11, the overlap ratio estimation algorithm 300 performs calculations based on active safety signals 212: target (object) width, host vehicle width, and lateral distance, as well as host vehicle signals 222: host vehicle speed, host vehicle yaw rate, and host vehicle steering angle. The extrapolation trigger 238 is also utilized.

At block 302, the minimum and maximum (min/max) values for the lateral distance between the host vehicle 12 and the target object 24 are determined. When the target object is in the field of view of the active safety system 100, i.e., extrapolation trigger 238=OFF, the min/max values for Lat. Dist. are the same and are equal to the lateral distance determined by the active safety system 100 (from active safety signals 212). When the object is outside the field of view (extrapolation trigger 238=ON), the minimum and maximum lateral distance are estimated, as follows:

$$\text{Lat\_Dist}_{min} = \text{Lat. Dist.} - \Delta \text{Lat\_Dist}; \text{ and}$$

$$\text{Lat\_Dist}_{max} = \text{Lat. Dist.} + \Delta \text{Lat\_Dist};$$

where $\Delta$Lat_Dist is calculated at block 304. $\Delta$Lat_Dist is the change in lateral distance between the host vehicle and the target object due to steering, and is calculated as a function of the host vehicle signals 222, namely steering angle, yaw rate, and speed:

$$\Delta \text{Lat\_Dist} = f(\text{Steering Angle, Yaw Rate, Speed}).$$

At block 306, overlaps between the host vehicle and the target object are calculated. More specifically, minimum and maximum values for left and right overlap are calculated using the lateral distance minimum and maximum values calculated at block 302, as follows:

$$\text{Left\_Overlap}_{min} = 0.5*(HW+TW) - \text{Lat\_Dist}_{min};$$

$$\text{Right\_Overlap}_{min} = 0.5*(HW+TW) + \text{Lat\_Dist}_{min};$$

$$\text{Left\_Overlap}_{max} = 0.5*(HW+TW) - \text{Lat\_Dist}_{max}; \text{ and}$$

$$\text{Right\_Overlap}_{max} = 0.5*(HW+TW) + \text{Lat\_Dist}_{max};$$

where HW=host width and TW=target width from active safety signals 212.

From the calculations performed at block 306, the impact side 308 is determined based on the signage of the overlap where, a positive overlap value is indicative of a left/driver side overlap and a negative overlap value is indicative of a right/passenger side overlap. This +/− convention could, of course, be reversed. This is an example of why it can be important to include the active safety signal translator (FIG. 5) and host vehicle signal translator (FIG. 7), as they help maintain fidelity of this and other similar conventions.

At block 310, the minimum and maximum overlap values are used to calculate a minimum overlap ratio 312 and a maximum overlap ratio 314, as follows:

$$\text{Overlap\_Ratio}_{min} = 100*\text{Overlap}_{min}/HW;$$

$$\text{Overlap\_Ratio}_{max} = 100*\text{Overlap}_{max}/HW.$$

Collision Data Qualification Check

Figure 12:
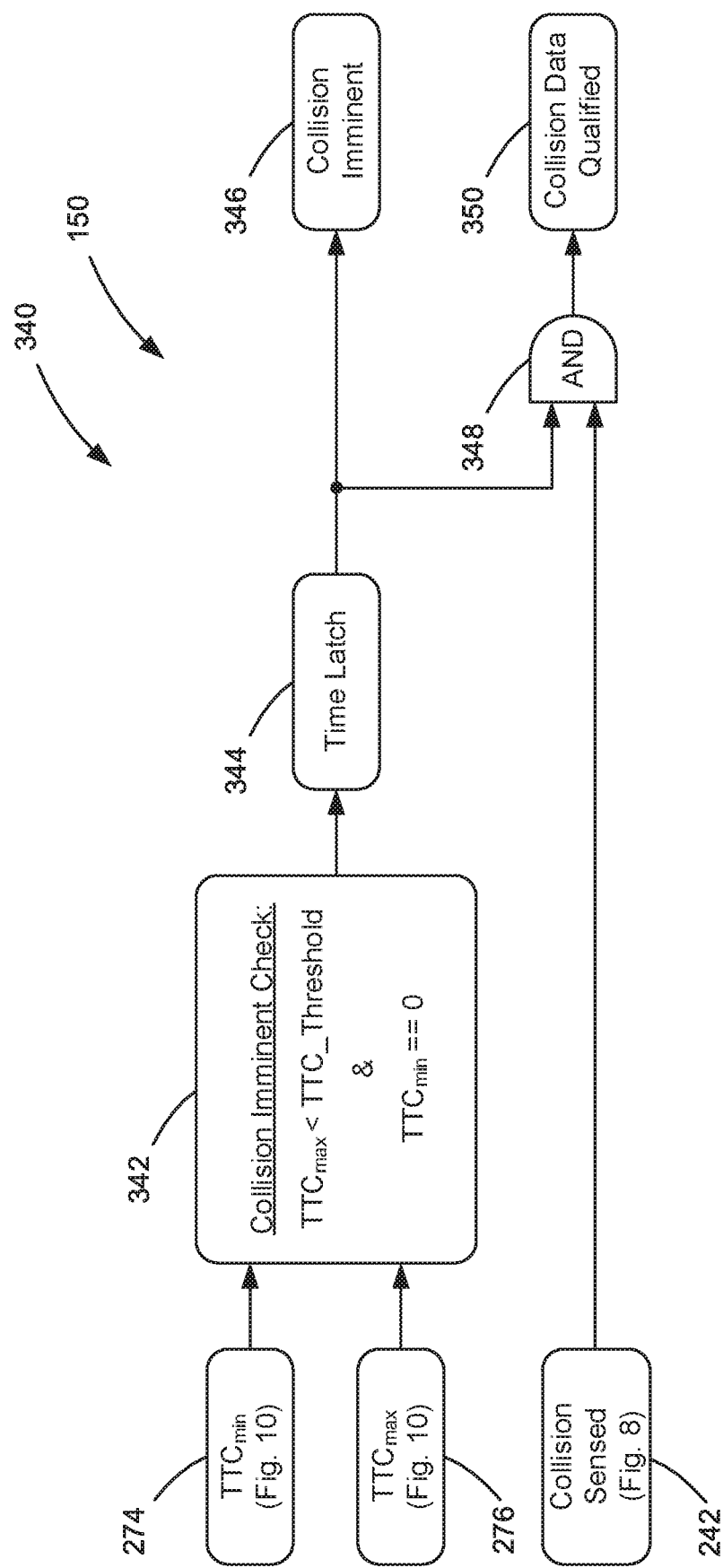

The collision data qualification algorithm 340 of the collision estimation algorithm 252 is shown in FIG. 12. The collision data qualification algorithm 340 uses the front collision sensed flag 242 to qualify active safety signals at the time of impact. At block 342, a check is performed to determine whether a collision is imminent. A collision is imminent if the time to collision (TTC) is within a predetermined range. As shown, if $TTC_{max}$ 276 is less than a TTC threshold value (which is configurable/tunable) and $TTC_{min}$ is equal to zero, a collision is determined to be imminent (block 346). The collision imminent indication 346 can be time latched at block 344. At AND block 348, if the collision is imminent AND a front collision sensed flag 242 is triggered, the collision data is qualified (block 350).

Active Crash Mode Classification

Figure 13:
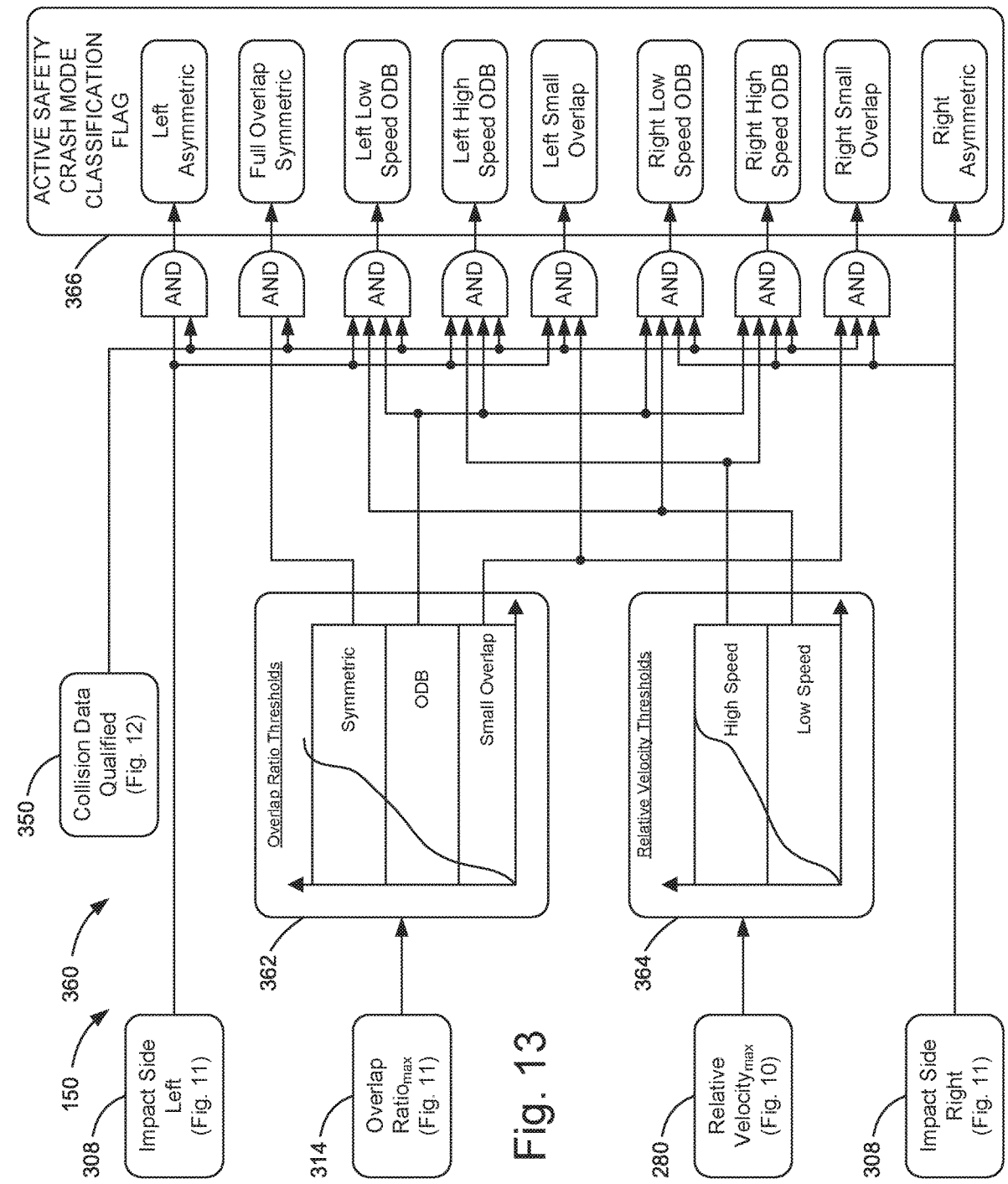

Referring to FIG. 13, the active safety crash mode classification algorithm 360 classifies the crash using information obtained from the active safety system 100. Utilization of the active crash mode classification algorithm 360 is predicated on the collision data being qualified (see FIG. 12). As shown in FIG. 13, the active crash mode classification algorithm 360 utilizes the impact side 308 (see FIG. 11), the maximum overlap ratio 314 (see FIG. 11), and the maximum relative velocity 280 (see FIG. 10) to classify the collision.

The active crash mode classification algorithm 360 implements an overlap ratio threshold metric 362 that evaluates the maximum overlap ratio 314 to classify the crash as symmetric, offset deformable barrier (ODB), or small overlap and provides an output indicative of the classified overlap type. The overlap thresholds implemented in the metric 362 can be configurable or tunable to define the different crash types in terms of overlap. The active crash mode classification algorithm 360 also implements a relative velocity threshold metric 364 that evaluates the maximum relative velocity 280 to classify the crash as high speed or low speed. The speed thresholds implemented in the metric 364 can be configurable or tunable to define the different crash types in terms of speed.

As shown in FIG. 13, the active crash mode classification algorithm 360 implements Boolean logic to classify the crash using the information obtained from the active safety signals and the determinations made by the metrics 362, 364. The classifications are set forth in the following table:

| Impact Side | Overlap Metric | Velocity Metric | Active Classification |
|---|---|---|---|
| Neither | Symmetric | — | Full Overlap Symmetric |
| Left | — | — | Left Asymmetric |
| Left | ODB | Low Speed | Left Low Speed ODB |
| Left | ODB | High Speed | Left High Speed ODB |
| Left | Small Overlap | — | Left Small Overlap |
| Right | ODB | Low Speed | Right Low Speed ODB |
| Right | ODB | High Speed | Right High Speed ODB |
| Right | Small Overlap | — | Right Small Overlap |
| Right | — | — | Right Asymmetric |

All Must Be Satisfied:

As shown in the above table, a full overlap symmetric collision is indicated where the overlap ratio threshold metric 362 indicates a symmetric collision and neither impact side is indicated, regardless of vehicle speed. Left or right asymmetric collisions are indicated where the impact side is indicated as left or right, respectively, and the overlap type is not classified, regardless of vehicle speed. Left or right low speed ODB collisions are indicated where the impact side is left or right, respectively, the overlap metric indicates ODB, and the velocity metric indicates low speed. Left or right high speed ODB collisions are indicated where the impact side is left or right, respectively, the overlap metric indicates ODB, and the velocity metric indicates high speed. Left or right small overlap collisions are indicated where the impact side is left or right, respectively and the overlap metric indicates small overlap.

Active Safety Confidence Factor

Figure 14:
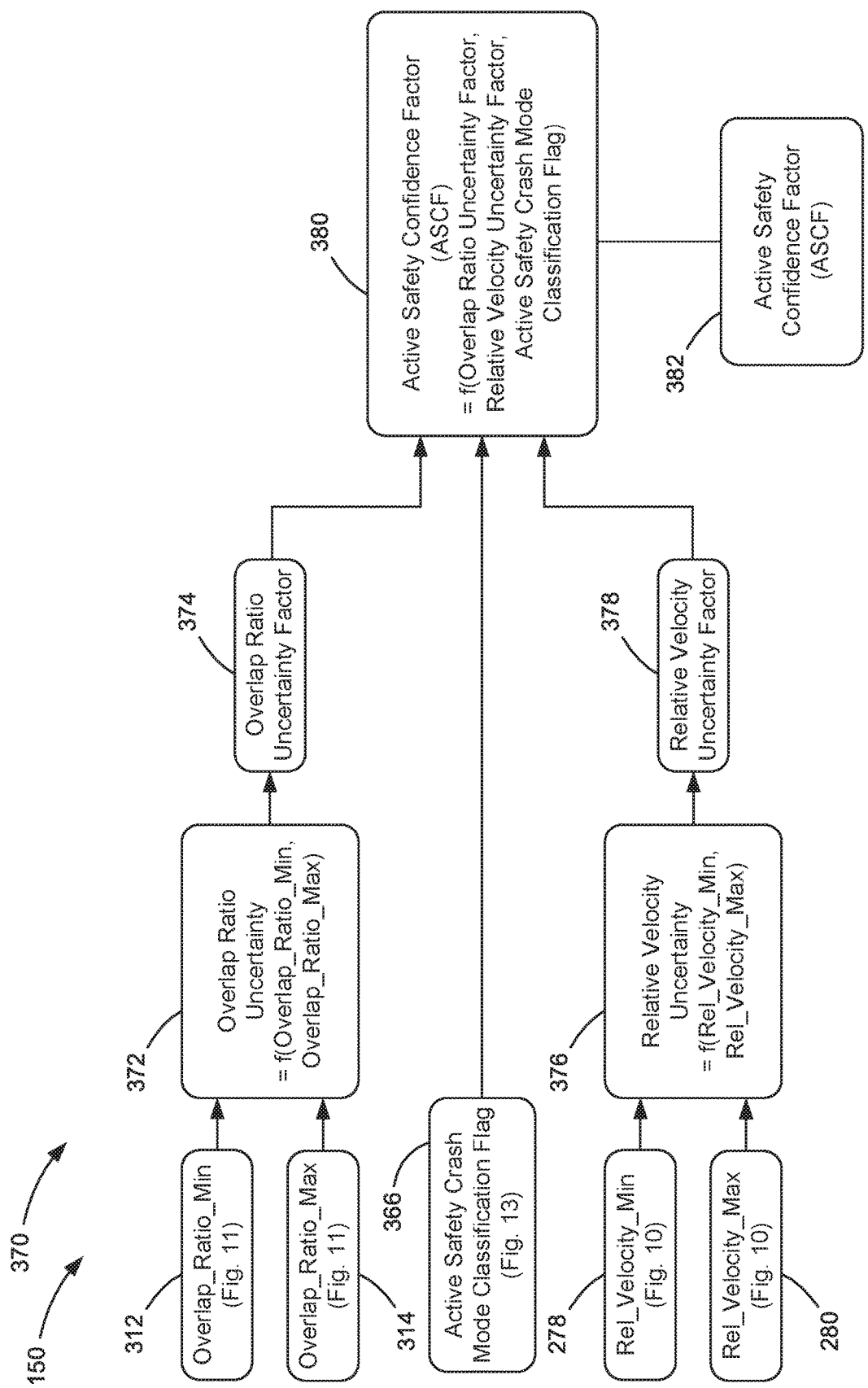

Referring to FIG. 14, the active safety confidence factor determination algorithm 370 determines an active safety confidence factor (ASCF) 382. The active safety confidence factor 380 is a measure of the confidence that can be placed on the active safety crash mode classification flag 366, based on the information obtained by the active safety system 100 leading up to the crash event. Because the active safety crash mode classification flag 366 is an estimation-based classification, the active safety confidence factor 380 provides an indication of how likely the estimation is to correctly classify the crash mode.

As shown in FIG. 14, active safety confidence factor determination algorithm 370 includes an overlap uncertainty function block 372 that determines an overlap ratio uncertainty factor 374 as a function of the min/max values Overlap_Ratio_Min 312 and Overlap_Ratio_Max 314 determined by the overlap estimation algorithm 300 of FIG. 11. The overlap ratio uncertainty factor 374 can, for example, be a value in the range of zero to one (0-1), where zero indicates minimum uncertainty and one indicates maximum uncertainty.

The overlap uncertainty function 372 implemented at block 372 can be implemented in a variety of manners. For example, the overlap uncertainty function block 372 can determine the overlap ratio uncertainty factor 374 as a function of the spread or delta between the min/max overlap ratio values 312, 314. In this example, the overlap uncertainty factor 374 can increase (i.e., uncertainty can increase) proportionally with the spread/delta between the min/max values 312, 314. Therefore, where the min/max spread is low, the uncertainty is low, and the overlap uncertainty factor 374 is correspondingly low. Conversely, where the min/max spread is high, the uncertainty is high, and the overlap uncertainty factor 374 is correspondingly high.

Also shown in FIG. 14, the active safety confidence factor determination algorithm 370 also includes a relative velocity uncertainty function block 376 that determines an relative velocity uncertainty factor 378 as a function of the min/max values Relative_Velocity_Min 278 and Relative_Velocity_Max 280 determined by the relative velocity estimation algorithm 270 of FIG. 10. The relative velocity uncertainty factor 378 can, for example, be a value in the range of zero to one (0-1), where zero indicates minimum uncertainty and one indicates maximum uncertainty.

The relative velocity uncertainty function implemented at block 376 can be implemented in a variety of manners. For example, the relative velocity uncertainty function block 376 can determine the relative velocity uncertainty factor 378 as a function of the spread or delta between the min/max relative velocity values 278, 280. In this example, the relative velocity uncertainty factor 378 can increase (i.e., uncertainty can increase) proportionally with the spread/delta between the min/max values 278, 280. Therefore, where the min/max spread is low, the uncertainty is low, and the relative velocity uncertainty factor 378 is correspondingly low. Conversely, where the min/max spread is high, the uncertainty is high, and the overlap uncertainty factor 378 is correspondingly high.

The active safety confidence factor determination algorithm 370 also includes an active safety confidence factor function block 380 that determines the active safety confidence factor 382. As shown in FIG. 14, the active safety confidence factor function 380 is based on the overlap ratio uncertainty factor 374, the relative velocity uncertainty factor 378, and the active safety crash mode classification flag 366. In the example implementation described herein, the relative velocity uncertainty factor 378 can be a value in the range of zero to one (0-1), where zero indicates minimum confidence in the accuracy of the active safety crash mode classification flag 366 and one indicates maximum confidence in the accuracy of the active safety crash mode classification flag.

The active safety confidence factor function 380 can be implemented in a variety of manners. For example, the active safety confidence factor function 380 can determine the active safety confidence factor 382 as a function of the uncertainty factors 374, 378 based on the active safety crash mode classification flag 366. This can, for example, be a plurality of look-up tables where the table to be used is determined by the classification flag 366 and the confidence factor 382 is looked-up in the table based on the combination of uncertainty factors 374, 378. The confidence factors associated with the various combinations of uncertainty factors can be determined through testing performed on the specific vehicle platform in which the vehicle safety system 10 is implemented.

Weighted Crash Mode Classification

Figure 15:
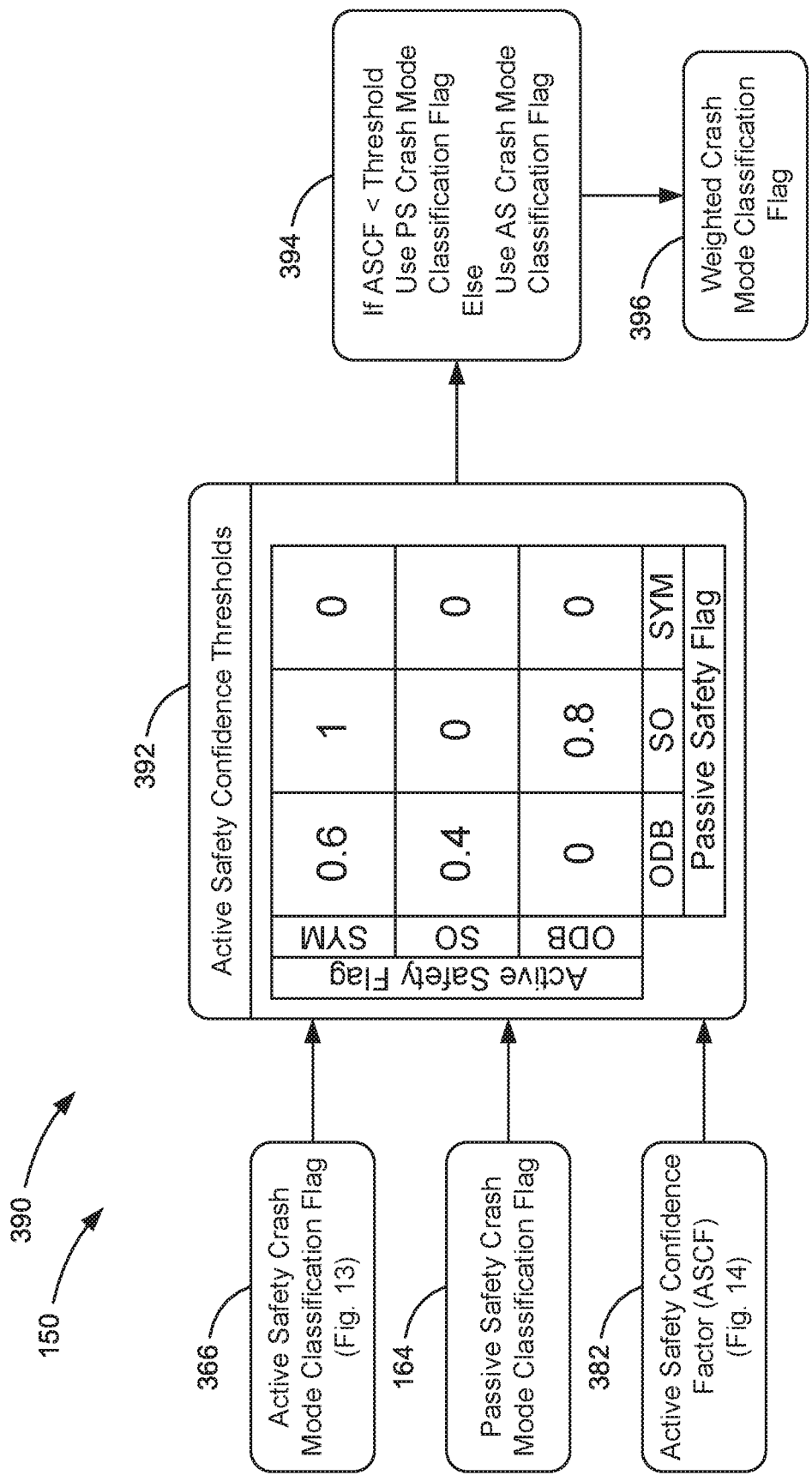

Referring to FIG. 15, the weighted crash mode decision algorithm 390 determines a weighted crash mode classification flag 396 based on the active safety confidence factor (ASCF) 382. If the active safety confidence factor 382 meets or exceeds a threshold confidence value, the active safety crash mode classification flag 366 is implemented as the weighted crash mode classification flag 396. If the active safety confidence factor 382 does not exceed a threshold confidence value, the passive safety crash mode classification flag 164 is implemented as the weighted crash mode classification flag 396.

The weighted crash mode decision algorithm 390 includes an active safety confidence threshold matrix 392 that implements threshold confidence values for various combinations of crash mode classifications indicated by the active safety crash mode classification flag 366 and the passive safety crash mode classification flag 164. The threshold confidence values indicate the confidence or probability that the active safety crash mode classification 366 is correct, and are assigned on a scale of zero to one (0-1), with one being the highest confidence and zero being the lowest. In the matrix 392, a confidence value is assigned to each of the plurality of crash mode combinations that can be indicated by the active safety crash classification flag 366 and the passive safety crash classification flag 164.

The matrix 392 in the example configuration of FIG. 15 includes threshold confidence values for three different crash modes that can be classified by the active and passive safety systems: offset deformable barrier (ODB), small offset (SO), and symmetrical (SYM). The crash modes implemented in the matrix 392 can vary. For each crash mode combination, the matrix 392 includes a threshold confidence value that must be exceeded for the active safety crash classification to be outputted from the algorithm 390 as the weighted crash mode classification flag 396. Each of these thresholds are configurable and tunable so that the system can be tailored to specific vehicle platforms and manufacturer requirements. It should be noted that, where the active and passive classification flags 366, 164 are in agreement (as shown in the matrix cells extending diagonally up and to the right), no decision is necessary and the threshold classification is zero.

Various factors can affect the threshold confidence values implemented in the matrix 392. On any given vehicle platform, the passive safety system 20 can be better than the active safety system 100 at classifying certain crash modes, and worse than the active safety system at classifying other crash modes. It is through crash testing and other research that the threshold confidence values in the matrix 392 are set.

The weighted crash mode decision algorithm 390 compares the active safety confidence factor 382 to the value in the matrix 392 that corresponds to the combination of active/passive crash mode classification flags 366, 164 produced by the crash event. As shown at block 394, if the active safety confidence factor 382 is <than the confidence threshold from the matrix 392, the passive safety crash mode classification flag 164 is implemented as the weighted crash mode classification flag 396. Otherwise, i.e., if the active safety confidence factor 382 is the confidence threshold from the matrix 392, the active safety crash mode classification flag 366 is implemented as the weighted crash mode classification flag 396.

For example, consider a crash event where the active safety crash mode classification flag 366 indicates a symmetrical (SYM) crash event and the passive safety crash mode classification flag 164 indicates an offset deformable barrier (ODB) crash event. In this scenario, if the active safety confidence factor (ASCF) 382 is <0.6, the passive safety crash mode classification flag 164, i.e., ODB, is passed as the weighted crash mode classification flag 396. Otherwise, i.e., if the active safety confidence factor 382 is 0.6 the active safety crash mode classification flag 366, i.e. SYM, is passed as the weighted crash mode classification flag 396.

As another example, consider a crash event where the active safety crash mode classification flag 366 indicates a small offset (SO) or offset deformable barrier (ODB) crash event and the passive safety crash mode classification flag 164 indicates a symmetrical (SYM) crash event. In either of these scenarios, if the active safety confidence factor (ASCF) 382 is >0, the active safety crash mode classification flag 366, i.e. SO or ODB, is passed as the weighted crash mode classification flag 396.

As a further example, consider a crash event where the active safety crash mode classification flag 366 indicates an ODB crash event and the passive safety crash mode classification flag 164 indicates an SO crash event. In this scenario, if the active safety confidence factor (ASCF) 382 is <0.8, the passive safety crash mode classification flag 164, i.e., SO, is passed as the weighted crash mode classification flag 396. Otherwise, i.e., if the active safety confidence factor 382 is 0.8 the active safety crash mode classification flag 366, i.e. ODB, is passed as the weighted crash mode classification flag 396.

Advantageously, the control algorithm 150 allows for utilizing the active safety system 100 to reliably and accurately classify a crash mode. One advantage realized through this is that the active safety system 100 estimates/predicts the crash mode based on perceived conditions prior to the occurrence of the crash event. The vehicle safety system 10, implementing the control algorithm 150 utilizing the active safety system 100, can therefore classify the crash mode earlier than would be possible with the passive safety system 20 alone. Once determined, the weighted crash mode classification flag 396 can be used to select individual misuse boxes and delays implemented by the passive safety system 20 to control firing of the vehicle safety devices 14 in response to the frontal collision.

From the above description of the invention, those skilled in the art will perceive improvements, changes and modifications. Such improvements, changes, and/or modifications within the skill of the art are intended to be covered by the appended claims.

We claim:
1. A method for helping to protect a vehicle occupant in the event of a frontal collision, comprising:
   determining a passive safety crash mode classification in response to crash signals received in response to an occurrence of a crash event;
   determining an active safety crash mode classification in response to active safety signals received prior to the occurrence of the crash event;
   determining an active safety confidence factor for the active safety crash mode classification;
   determining a weighted crash mode classification as being the active crash mode classification in response to the active safety confidence factor exceeding a predetermined threshold confidence value;
   determining the weighted crash mode classification as being the passive crash mode classification in response to the active safety confidence factor not exceeding the predetermined threshold confidence value;
   determining the occurrence of a frontal collision in response to the crash signals; and
   actuating a vehicle occupant protection device according to the weighted crash mode classification.
2. The method recited in claim 1, wherein determining the active safety crash mode classification comprises estimating collision characteristics in response to the active safety signals.

3. The method recited in claim 2, wherein estimating the collision characteristics comprises identifying an object in a field of view of the active safety sensors and, for that object:
   determining a time to collision of the vehicle with the object;
   determining a relative velocity between the vehicle and the object; and
   determining an overlap ratio between the vehicle and the object.

4. The method recited in claim 3, wherein identifying an object in the field of view of the active safety sensor comprises determining the object closest to the vehicle.

5. The method recited in claim 3, wherein determining the time to collision comprises estimating a minimum time to collision and a maximum time to collision using predetermined acceleration and deceleration values for the vehicle and target.

6. The method recited in claim 3, wherein determining the relative velocity comprises estimating a minimum relative velocity and a maximum relative velocity using predetermined acceleration and deceleration values for the vehicle and target.

7. The method recited in claim 3, wherein determining the overlap ratio comprises:
   determining the width of the vehicle and the width of the object;
   determining the lateral distance between longitudinal centerlines of the vehicle and the object;
   determining the overlap as the sum of one-half the vehicle width, one-half the object width, and the lateral distance between longitudinal centerlines of the vehicle and the object.

8. The method recited in claim 7, wherein determining the lateral distance between the longitudinal centerlines of the vehicle and the object comprises estimating minimum and maximum lateral distances between the longitudinal centerlines of the vehicle and the object.

9. The method recited in claim 8, wherein estimating minimum and maximum lateral distances between the longitudinal centerlines of the vehicle and the object comprises estimating a change in lateral distance as a function of the vehicle speed, steering angle, and yaw rate.

10. The method recited in claim 3, wherein determining the overlap ratio comprises determining an impact side of the vehicle as being a left/driver side or right/passenger side of the vehicle.

11. The method recited in claim 10, further comprising determining whether a collision is imminent in response to the time to collision being less than a threshold value.

12. The method recited in claim 11, further comprising determining the active safety crash mode classification in response to determining that a collision is imminent, the impact side of the vehicle, an overlap classification, and a velocity classification.

13. The method recited in claim 12, wherein the overlap classification comprises one of an asymmetric classification, a symmetric (full overlap) classification, an offset deformable barrier (ODB) classification, and a small overlap classification.

14. The method recited in claim 12, wherein the velocity classification comprises one of a high speed and low speed classification.

15. The method recited in claim 1, wherein determining the active safety crash mode classification comprises determining, in response to active safety signals, at least one of a longitudinal distance between the vehicle and the object, a lateral distance between a centerline of the vehicle and the object, a range between the vehicle and the object, an angle of approach between the vehicle and the object, and a velocity of the vehicle relative to the object.

16. A vehicle safety system for helping to protect a vehicle occupant in the event of a frontal collision, comprising:
   one or more passive sensors for sensing a vehicle crash and providing crash signals in response to sensing the vehicle crash;
   one or more active sensors configured to sense an object in the path of the vehicle and to provide active safety signals in response to sensing the object in the path of the vehicle;
   a vehicle occupant protection device; and
   a controller operatively connected to the one or more passive sensors and to the one or more active sensors, wherein the controller is configured to:
   determine a passive safety crash mode classification in response to the crash signals received from the one or more passive sensors in response to an occurrence of a crash event;
   determine an active safety crash mode classification in response to the active safety signals received from the one or more active safety sensors prior to the occurrence of the crash event;
   determine an active safety confidence factor for the active safety crash mode classification;
   determine a weighted crash mode classification as being the active crash mode classification in response to the active safety confidence factor exceeding a predetermined threshold confidence value;
   determine the weighted crash mode classification as being the passive crash mode classification in response to the active safety confidence factor not exceeding the predetermined threshold confidence value;
   determine the occurrence of a frontal collision in response to the crash signals; and
   actuate the vehicle occupant protection device according to the weighted crash mode classification.

17. The vehicle safety system recited in claim 16, wherein the one or more active sensors comprises at least one of a camera, a radar sensor, and a laser radar (LIDAR) sensor.

18. The vehicle safety system recited in claim 16, wherein the controller comprises an airbag controller unit (ACU).

19. A vehicle comprising the vehicle safety system recited in claim 16.

* * * * *